(12) United States Patent
Shinohara

(10) Patent No.: US 12,530,242 B2
(45) Date of Patent: Jan. 20, 2026

(54) COMPUTATIONAL RESOURCE CLUSTER MANAGEMENT DEVICE, COMPUTATIONAL RESOURCE CLUSTER MANAGEMENT METHOD, AND COMPUTATIONAL RESOURCE CLUSTER MANAGEMENT PROGRAM

(71) Applicant: NTT, Inc., Tokyo (JP)

(72) Inventor: Kenta Shinohara, Musashino (JP)

(73) Assignee: NTT, Inc., Tokyo (JP)

( * ) Notice: Subject to any disclaimer, the term of this patent is extended or adjusted under 35 U.S.C. 154(b) by 456 days.

(21) Appl. No.: 18/038,170

(22) PCT Filed: Dec. 1, 2020

(86) PCT No.: PCT/JP2020/044643
§ 371 (c)(1),
(2) Date: May 22, 2023

(87) PCT Pub. No.: WO2022/118369
PCT Pub. Date: Jun. 9, 2022

(65) Prior Publication Data
US 2024/0004720 A1    Jan. 4, 2024

(51) Int. Cl.
*G06F 9/50* (2006.01)
(52) U.S. Cl.
CPC .......... *G06F 9/5077* (2013.01); *G06F 9/5072* (2013.01)
(58) Field of Classification Search
CPC .................................................... G06F 9/5077
See application file for complete search history.

(56) References Cited

PUBLICATIONS

Goudarzi, Hadi, and Massoud Pedram. "Multi-dimensional SLA-based resource allocation for multi-tier cloud computing systems." 2011 IEEE 4th International Conference on Cloud Computing. IEEE, 2011. (Year: 2011).*

Ardagna, Danilo, Marco Trubian, and Li Zhang. "SLA based resource allocation policies in autonomic environments." Journal of Parallel and Distributed Computing 67.3 (2007): 259-270. (Year: 2007).*

(Continued)

*Primary Examiner* — Charlie Sun
(74) *Attorney, Agent, or Firm* — Fish & Richardson P.C.

(57) ABSTRACT

A cluster management apparatus includes: a container configuration reception unit that receives a configuration definition of an application including a total requested resource amount for a calculation resource cluster and a requested resource maximum amount of a single container which operates on the calculation resource cluster; and a calculation resource calculation unit that calculates a combination of the number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than three, and that the number of calculation resources to which a requested resource maximum amount of a single container included in the calculation resource cluster can be assigned is equal to or larger than three.

18 Claims, 32 Drawing Sheets

(56) References Cited

PUBLICATIONS

Cloud Native Computing Foundation, "Managing Resources for Containers," kubernetes, Sep. 21, 2020, retrieved from URL <https://kubernetes.io/docs/concepts/configuration/manage-resources-containers/#requests-and-limits>, 11 pages.

Cloud Native Computing Foundation, "Production-Grade Container Orchestration," kubernetes, retrieved on Nov. 12, 2020, retrieved from URL <https://kubernetes.io/>, 6 pages.

Red Hat, Inc., "Resource quotas per project," Red Hat Open Shift, retrieved on Nov. 12, 2020, retrieved from URL <https://docs.openshift.com/container-platform/4.1/applications/quotas/quotas-setting-per-project.html>, 9 pages.

SCSK Corporation, "Understanding Kubernetes limits and requests with examples," sysdig, Jan. 22, 2020, retrieved from URL <https://www.scsk.jp/sp/sysdig/blog/sysdig_monitor/kubernetes_118.html>, 29 pages (with English Translation).

\* cited by examiner

Fig. 5

```
apiVersion: apps/v1
kind: Deployment
metadata:
  name: app-a-deployment
  labels:
    app: app-a
spec:
  replicas: 3                    —— 51a
  selector:
    matchLabels:
      app: app-a
  template:
    metadata:
      labels:
        app: app-a
    spec:
      containers:
      - name: app-a
        image: app-a:1.14.2
        resources:
          requests:
            cpu: "500m"          —— 52a
```

```
apiVersion: apps/v1                              5b
kind: Deployment
metadata:
  name: app-b-deployment
  labels:
    app: app-b
spec:
  replicas: 1                                    51b
  selector:
    matchLabels:
      app: app-b
  template:
    metadata:
      labels:
        app: app-b
    spec:
      containers:
      - name: app-b
        image: app-b:1.14.2
        resources:
          requests:
            cpu: "100m"                          52b
```

COMPUTATIONAL RESOURCE CLUSTER MANAGEMENT DEVICE, COMPUTATIONAL RESOURCE CLUSTER MANAGEMENT METHOD, AND COMPUTATIONAL RESOURCE CLUSTER MANAGEMENT PROGRAM

CROSS-REFERENCE TO RELATED APPLICATIONS

This application is a National Stage application under 35 U.S.C. § 371 of International Application No. PCT/JP2020/044643, having an International Filing Date of Dec. 1, 2020.

The disclosure of the prior application is considered part of the disclosure of this application, and is incorporated by reference in its entirety into this application.

TECHNICAL FIELD

The present invention relates to a calculation resource cluster management apparatus, a calculation resource cluster management method, and a calculation resource cluster management program that efficiently accommodate and assign an application to a calculation resource.

BACKGROUND ART

As a management system of an application that deploys an application on a calculation resource in units of containers and scales the application as necessary, kubernetes is known (Non Patent Literature 1). Here, the calculation resource is a physical server or a virtual machine, and a container operates on the calculation resource. A unit of collection of containers is a physical server, a virtual machine, or a project (Non Patent Literature 2).

In a case where a container is assigned to a calculation resource, a definition file in which a calculation resource requested by a container, for example, a central processing unit (CPU) or a memory is described is transmitted to a management system (kubernetes). In addition, the management system determines an appropriate calculation resource for a container from calculation resources managed by the own management system (Non Patent Literatures 3 and 4).

CITATION LIST

Non Patent Literature

Non Patent Literature 1: kubernetes, "Production-Grade Container Orchestration", [retrieved on Nov. 12, 2020], Internet <URL:https://kubernetes.io/>

Non Patent Literature 2: RedHat, "Resource quotas per project", [retrieved on Nov. 12, 2020], Internet <https://docs.openshift.com/container-platform/4.1/applications/quotas/quotas-setting-per-project.html>

Non Patent Literature 3: kubernetes, "Managing Resources for Containers", [retrieved on Nov. 12, 2020], Internet <https://kubernetes.io/docs/concepts/configuration/manage-resources-containers/#requests-and-limits>

Non Patent Literature 4: sysdig, "Understanding limits and requests of Kubernetes with examples", [retrieved on Nov. 12, 2020], Internet <https://www.scsk.jp/sp/sysdig/blog/sysdig monitor/kubernetes_118.html>

SUMMARY OF INVENTION

Technical Problem

In a case where the management system of the application does not assign the appropriate number of calculation resources corresponding to the appropriate number of CPUs to containers, an operation rate of the application implemented by each container decreases.

Therefore, an object of the present invention is to efficiently accommodate and assign a container to a calculation resource in a calculation resource cluster management apparatus, a calculation resource cluster management method, and a calculation resource cluster management program.

Solution to Problem

In order to solve the above-described problem, according to the present invention described in claim 1, there is provided a calculation resource cluster management apparatus including: a container configuration reception unit that receives a configuration definition of an application including a total requested resource amount for a calculation resource cluster and a requested resource maximum amount of a single container which operates on the calculation resource cluster; and a calculation resource calculation unit that calculates a combination of the number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

Advantageous Effects of Invention

According to the present invention, it is possible to efficiently accommodate and assign a container to a calculation resource.

BRIEF DESCRIPTION OF DRAWINGS

FIG. 5 is a diagram illustrating an example of a configuration definition file.

FIG. 6 is a diagram illustrating an example of a configuration definition file.

DESCRIPTION OF EMBODIMENTS

Hereinafter, an embodiment for implementing the present invention will be described in detail with reference to the drawings.

Figure 1:
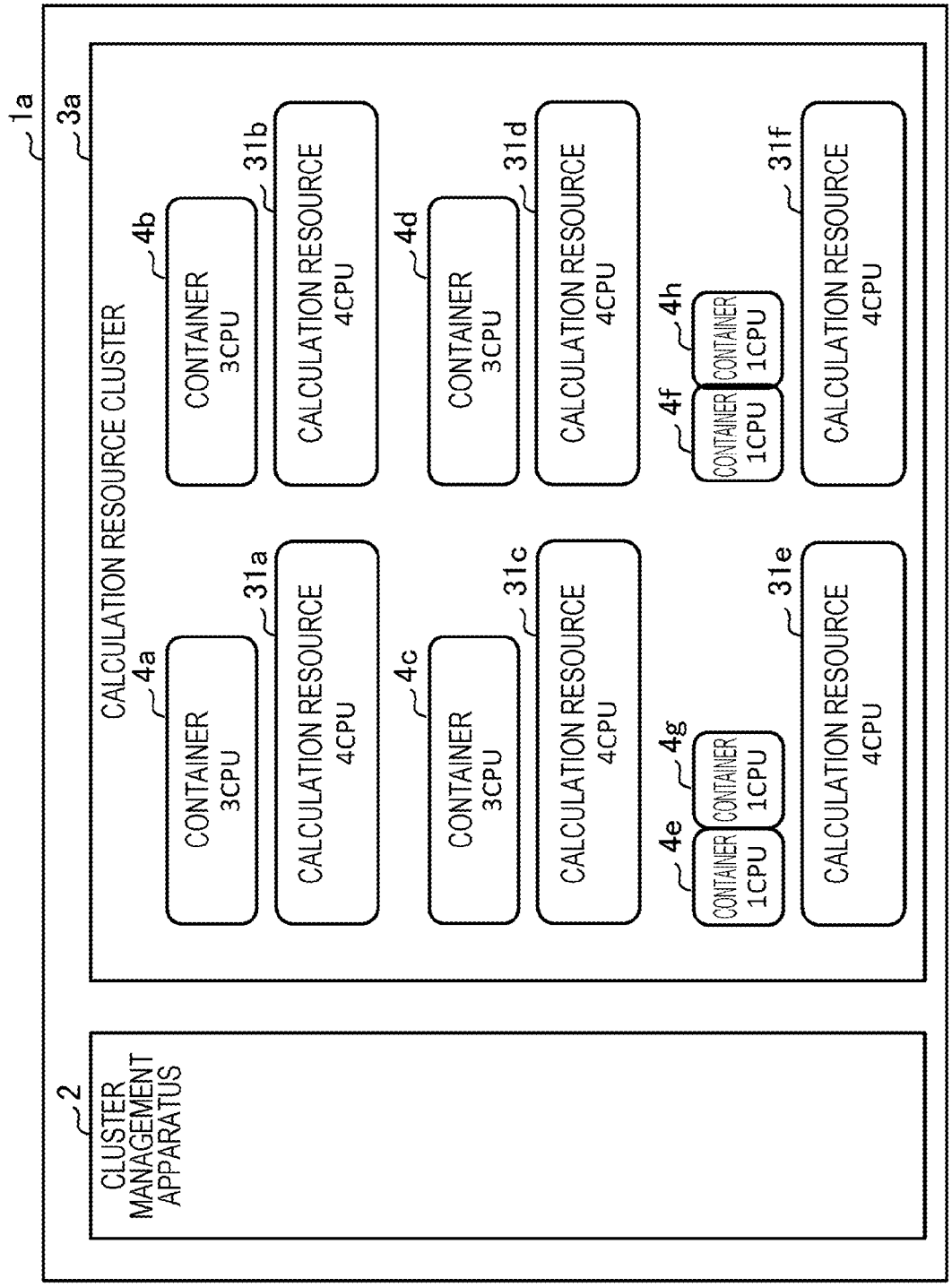
FIG. 1 is a diagram illustrating a state of a calculation resource cluster including six calculation resources each of which includes four CPUs.

FIG. 1 is a diagram illustrating an example of a calculation resource cluster management system 1a including a calculation resource cluster 3a including six calculation resources 31a to 31f each of which includes four CPUs and a cluster management apparatus 2.

Here, the calculation resources 31a to 31f are physical servers or virtual machines, and can operate containers. The calculation resource cluster 3a includes the calculation resources 31a to 31f. The cluster management apparatus 2 is, for example, a management server on which a kubernetes operates.

Figure 2:
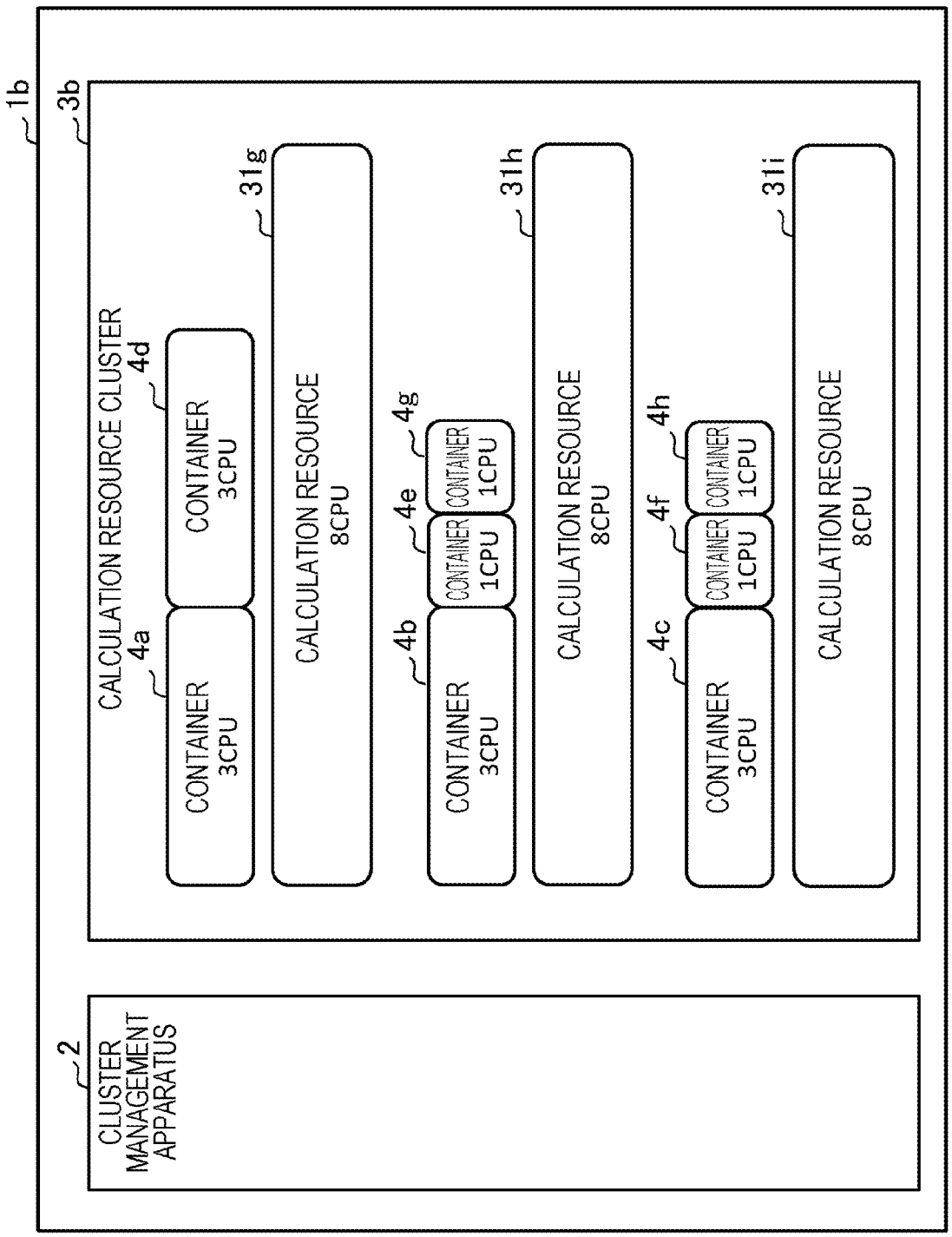
FIG. 2 is a diagram illustrating a state of a calculation resource cluster including three calculation resources each of which includes eight CPUs.

FIG. 2 is a diagram illustrating an example of a calculation resource cluster management system 1b including a calculation resource cluster 3b including three calculation resources 31g to 31i each of which includes eight CPUs and a cluster management apparatus 2.

Here, the calculation resources 31g to 31i are physical servers or virtual machines, and can operate containers. The calculation resource cluster 3b includes the calculation resources 31g to 31i. The cluster management apparatus 2 is, for example, a management server on which a kubernetes operates.

In the calculation resource cluster management system 1a illustrated in FIG. 1 and the calculation resource cluster management system 1b illustrated in FIG. 2, a case where the number of the containers 4a to 4d requesting three CPUs is four and the number of the containers 4e to 4h requesting one CPU is four in the definition file is illustrated. Note that each of the containers 4a to 4d and the containers 4e to 4h illustrated in FIG. 1 and FIG. 2 corresponds to a "Pod" which is a management unit of containers of the kubernetes.

The calculation resource cluster 3a illustrated in FIG. 1 includes six calculation resources 31a to 31f each of which includes four CPUs. The calculation resource cluster 3b illustrated in FIG. 2 includes three calculation resources 31g to 31i each of which includes eight CPUs. In both the calculation resource cluster 3a of FIG. 1 and the calculation resource cluster 3b of FIG. 2, the total number of the CPUs is 24.

The calculation resource cluster management system 1a of FIG. 1 can assign the containers 4a to 4h, which are designated in a definition file, to any one of the calculation resources 31a to 31f.

The container 4a is assigned to the calculation resource 31a. The container 4b is assigned to the calculation resource 31b. The container 4c is assigned to the calculation resource 31c. The container 4d is assigned to the calculation resource 31d. The containers 4e and 4g are assigned to the calculation resource 31e. The containers 4f and 4h are assigned to the calculation resource 31d.

Here, the cluster management apparatus 2 assigns the containers 4a to 4g to the calculation resources 31a to 31f in order from the calculation resource of which a remaining resource amount is largest. Thereby, the resource amounts of the calculation resources 31a to 31f are leveled.

The number of the CPUs included in the calculation resources 31a to 31f of the calculation resource cluster 3a is 24. In the 24 CPUs, 16 CPUs designated in the definition file are in a used state. At this time, an operation rate of the CPU is 67%.

The calculation resource cluster management system 1b of FIG. 2 can also assign the containers 4a to 4h, which are designated in a definition file, to any one of the calculation resources 31g to 31i.

The containers 4a and 4d are assigned to the calculation resource 31g. The containers 4b, 4e, and 4g are assigned to the calculation resource 31h. The containers 4c, 4f, and 4h are assigned to the calculation resource 31i.

Here, the cluster management apparatus 2 assigns the containers 4a to 4g to the calculation resources 31g to 31i in order from the calculation resource of which a remaining resource amount is largest. Thereby, the resource amounts of the calculation resources 31g to 31i are leveled.

The number of the CPUs included in the calculation resources 31g to 31i of the calculation resource cluster 3b is 24. In the 24 CPUs, 16 CPUs designated in the definition file are in a used state. At this time, an operation rate of the CPU is 67%.

However, in a case of the calculation resource cluster management system 1a of FIG. 1, even though it is desired to additionally assign a container requesting three CPUs, the cluster management apparatus 2 cannot add the container because a calculation resource that is required for assigning the container does not exist.

On the other hand, in a case of the calculation resource cluster management system 1b of FIG. 2, the cluster management apparatus 2 can additionally assign two containers requesting three CPUs to the two calculation resources 31h and 31i.

In the case of the calculation resource cluster management system 1a of FIG. 1, it is possible to further improve the operation rate by reviewing an algorithm of assigning the containers to the calculation resources. For example, the containers 4e to 4h requesting one CPU are assigned to any of the calculation resources 31a to 31d to which the containers 4a to 4d requesting three CPUs are assigned.

On the other hand, in a distributed system in which there is no guarantee that the calculation resources always operate as defined in advance, it is not always possible to solve the problem by such an optimal assignment algorithm, and thus it is necessary to optimize the calculation resource cluster.

Here, it is expected that the problem of the division loss as described above is solved by increasing a resource amount per one calculation resource. However, in the container management system, in a case where a resource amount per one calculation resource is increased, an influence range in a case where the calculation resource malfunctions is expanded. For this reason, in terms of the influence range in a case where the calculation resource malfunctions, it is desirable to minimize the resource amount per one calculation resource.

Therefore, it is necessary to select an optimum resource amount of the calculation resource and the number of the calculation resources in view of the problem of the division loss and the problem of the influence range in a case where the calculation resource malfunctions.

Figure 3:
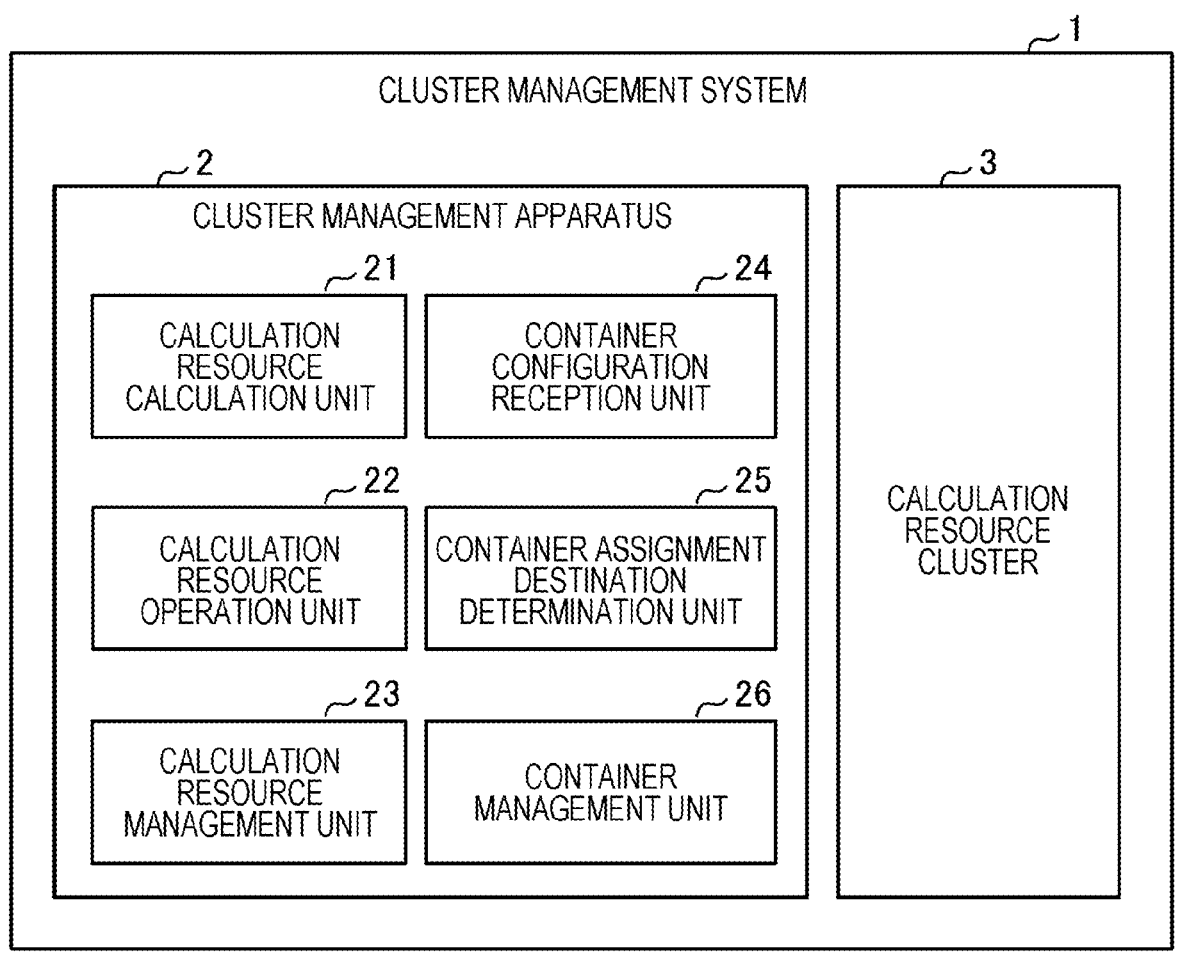
FIG. 3 is a configuration diagram of a calculation resource cluster management system according to a first embodiment and a second embodiment.

FIG. 3 is a configuration diagram of the calculation resource cluster management system 1 according to a first embodiment and a second embodiment.

The calculation resource cluster 3 includes a plurality of calculation resources including a virtual machine and a physical machine. These calculation resources operate containers.

The cluster management apparatus 2 is a computer that manages the calculation resource cluster 3. A kubernetes is installed in the cluster management apparatus 2, and thus the following functional units are implemented. The cluster management apparatus 2 functions as a calculation resource cluster management apparatus that manages the calculation resource cluster 3. Note that a hardware configuration of the cluster management apparatus 2 will be described later with reference to FIG. 4.

A container configuration reception unit 24 is a functional unit that receives a configuration definition file of an application, and has a standard function of the kubernetes. The configuration definition file of the application includes a total requested resource amount for the calculation resource cluster 3 and a requested resource maximum amount of a single container which operates on the calculation resource cluster 3. Note that the configuration definition file of the application will be described in detail with reference to FIG. 5 and FIG. 6 to be described later.

A calculation resource calculation unit 21 is a functional unit that calculates the required number of the calculation resources based on the configuration definition file of the application received by the container configuration reception unit 24. The calculation resource calculation unit 21 calculates a combination of the number of the calculation resources and the resource amount per one calculation resource, the combination satisfying constraint conditions that the resource amount of the calculation resource cluster 3 is larger than the total requested resource amount of the application, that the number of the calculation resources of the calculation resource cluster 3 is three or more, and that the number of the calculation resources to which a requested resource maximum amount of a single container included in the calculation resource cluster 3 can be assigned is three or more.

A container assignment destination determination unit 25 is a functional unit that determines a calculation resource as an assignment destination based on the configuration definition file of the application received by the container configuration reception unit 24, and has a standard function of the kubernetes.

A container management unit 26 is a functional unit that manages whether or not a container assigned to a calculation resource is normally operated, and has a standard function of the kubernetes.

A calculation resource management unit 23 is a functional unit that manages whether or not each calculation resource of the calculation resource cluster 3 is appropriately operated, and has a standard function of the kubernetes.

A calculation resource operation unit 22 is a functional unit that adds a new calculation resource or deletes an existing calculation resource to or from the calculation resource cluster 3, and has a standard function of the kubernetes. The calculation resource operation unit 22 adds a new calculation resource or deletes an unnecessary calculation resource according to the required number of the calculation resources calculated by the calculation resource calculation unit 21.

Figure 4:
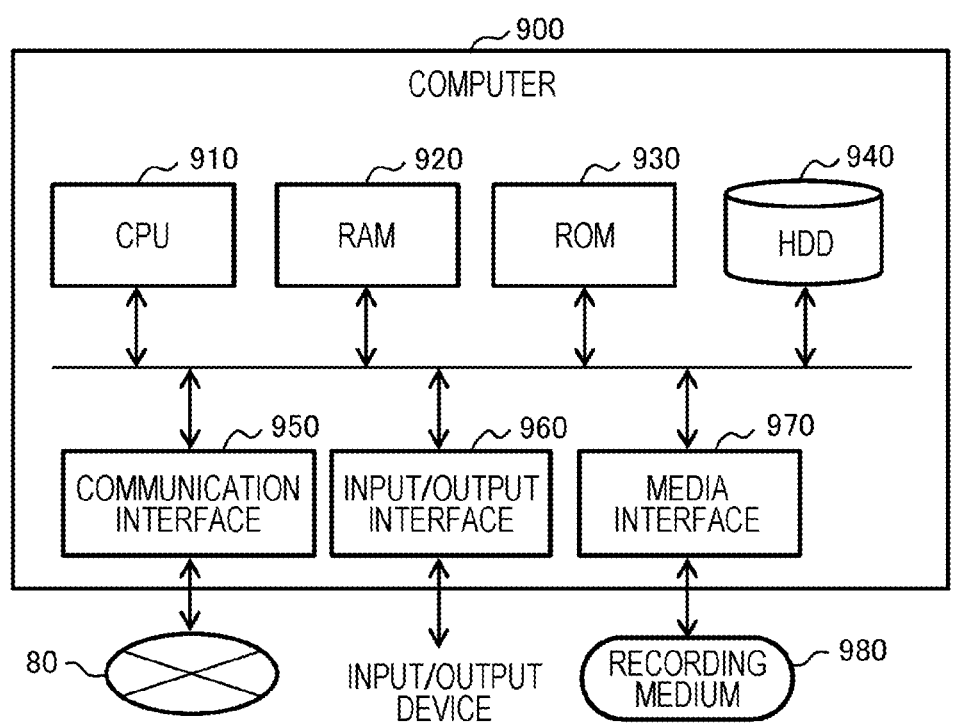
FIG. 4 is a diagram for explaining a hardware configuration of a cluster management apparatus.

FIG. 4 is a diagram for explaining a hardware configuration of the cluster management apparatus 2.

A computer 900 includes a CPU 910, a random access memory (RAM) 920, a read only memory (ROM) 930, a hard disk drive (HDD) 940, a communication interface 950, an input/output interface 960, and a media interface 970.

The CPU 910 is a central processing device that operates based on a calculation resource cluster management program stored in the ROM 930 or the HDD 940 and controls each unit. The ROM 930 is a nonvolatile memory, and stores a boot program executed by the CPU 910 in a case where the computer 900 is started, a program related to hardware of the computer 900, and the like. The RAM 920 is a volatile memory, and functions as a work area for storing variables and the like for the calculation resource cluster management program executed by the CPU 910.

The HDD 940 is a large-capacity storage device that stores a program executed by the CPU 910, data used by the program, and the like. The communication interface 950 receives data from other devices via a communication network 80, transmits the data to the CPU 910, and transmits data generated by the CPU 910 to other devices via the communication network 80.

The CPU 910 controls output devices such as a display and a printer and input devices such as a keyboard and a mouse via the input/output interface 960. The CPU 910 acquires data from the input device via the input/output interface 960. In addition, the CPU 910 outputs the generated data to the output device via the input/output interface 960.

The media interface 970 reads a program or data stored in the recording medium 980, and outputs the program or data to the CPU 910 via the RAM 920. The CPU 910 loads the program from the recording medium 980 into the RAM 920 via the media interface 970, and executes the loaded program. The recording medium 980 is, for example, an optical recording medium such as a digital versatile disc (DVD), a magneto-optical recording medium such as a magneto optical disk (MO), a tape medium, a magnetic recording medium, a semiconductor memory, or the like.

For example, in a case where the computer 900 functions as the cluster management apparatus 2 according to the present embodiment, the CPU 910 of the computer 900 executes the program loaded into the RAM 920, and thus each functional unit of the cluster management apparatus 2 is implemented. In addition, the HDD 940 stores data for each unit of the cluster management apparatus 2. The CPU 910 of the computer 900 reads these programs from the recording medium 980 and executes these programs. On the other hand, as another example, these programs may be acquired from another device via the communication network 80.

FIG. 5 is a diagram illustrating a configuration definition file 5a of an application A.

In a replicas line 51a, 3 is described, and this indicates that the number of the containers requested by the application A is 3. In the following, the number of the containers requested by the application A is denoted as $C_0$.

In a cpu line 52a, "500 m" is described, and this indicates that the number of the requested resources of the containers of the application A is 500. In the following, the number of the requested resources of the containers of the application A is denoted as $R_0$.

FIG. 6 is a diagram illustrating a configuration definition file 5b of an application B.

In a replicas line 51b, 1 is described, and this indicates that the number of the containers requested by the application B is 1. In the following, the number of the containers requested by the application B is denoted as $C_1$.

In a cpu line 52b, "100 m" is described, and this indicates that the number of the requested resources of the containers of the application B is 100. In the following, the number of the requested resources of the containers of the application A is denoted as $R_1$.

A total requested resource amount T in the calculation resource cluster in which these applications A and B are deployed is calculated by the following Equation (1).

$$T = C_0 \times R_0 + C_1 \times R_1 = 3 \times 500 + 1 \times 100 = 1600 \quad (1)$$

Here, since $R_1 > R_0$, a requested resource maximum value of a single container is 500.

In addition, as represented by the following Equation (2), a total resource amount requested by the application A is larger than a total resource amount requested by the application B. The total resource amount requested by the application A is referred to as a requested resource maximum amount of a single container of the application.

$$C_0 \times R_0 > C_1 \times R_1 \quad (2)$$

In a case where the container configuration reception unit 24 receives the configuration definition of the application, the calculation resource calculation unit 21 calculates a resource amount per one calculation resource and the number of the calculation resources belonging to the calculation resource cluster such that the following constraint conditions are satisfied.

Constraint Condition 1: The resource amount of the calculation resource cluster is larger than the total requested resource amount of the application. Note that the resource amount of the calculation resource cluster is calculated by multiplying the resource amount per one calculation resource by the number of the calculation resources of the calculation resource cluster 3.

Constraint Condition 2: The number of the calculation resources of the calculation resource cluster is three (first predetermined number) or more. At this time, assuming that one calculation resource operates and two calculation resources stand by as spares, even in a case where one calculation resource malfunctions, one calculation resource stands by as a spare. Therefore, reliability and fault-tolerance of the calculation resource cluster are secured.

Constraint Condition 3: Three or more (second predetermined number) calculation resources to which a requested resource maximum amount of a single container of the application can be assigned always exist in the calculation resource cluster. At this time, even in a case where one of the calculation resources to which the requested resource maximum amount of a single container can be assigned malfunctions, two calculation resources stand by as spares. Therefore, reliability and fault-tolerance of the calculation resource cluster are secured.

In a case where there are a plurality of combinations of the resource amount per one calculation resource and the number of the calculation resources that meet the above-described constraint conditions 1 to 3, the calculation resource calculation unit 21 selects a combination including the smallest resource amount of the calculation resource cluster and the largest number of the calculation resources. Further, the calculation resource calculation unit 21 adds a calculation resource required for the calculation resource cluster or deletes a calculation resource from the calculation resource cluster, via the calculation resource operation unit 22.

In the derivation of the combination satisfying the constraint conditions, the calculation resource calculation unit 21 may calculate the combination by multiplying a predetermined coefficient based on the total requested resource amount of the application and the requested resource maximum amount of a single container of the application, as in a first embodiment to be described later. That is, the calculation resource calculation unit 21 calculates a combination of the number of the calculation resources and the resource amount per one calculation resource, the combination satisfying the constraint conditions 1 to 3, by multiplying the total requested resource amount of the application and the requested resource maximum amount of a single container by a predetermined coefficient.

Further, as in a second embodiment to be described later, a container assignment simulation may be performed. That is, the calculation resource calculation unit 21 calculates a combination of the number of the calculation resources and the resource amount per one calculation resource, the combination satisfying the constraint conditions 1 to 3, by performing a container assignment simulation using the total requested resource amount of the application and the requested resource maximum amount of a single container.

Further, in a case where there are a plurality of combinations of the number of the calculation resources and the resource amount per one calculation resource that satisfy the constraint conditions 1 to 3, the calculation resource calculation unit 21 selects a combination including the smallest resource amount of the calculation resource cluster 3 and the largest number of the calculation resources.

Figure 7:
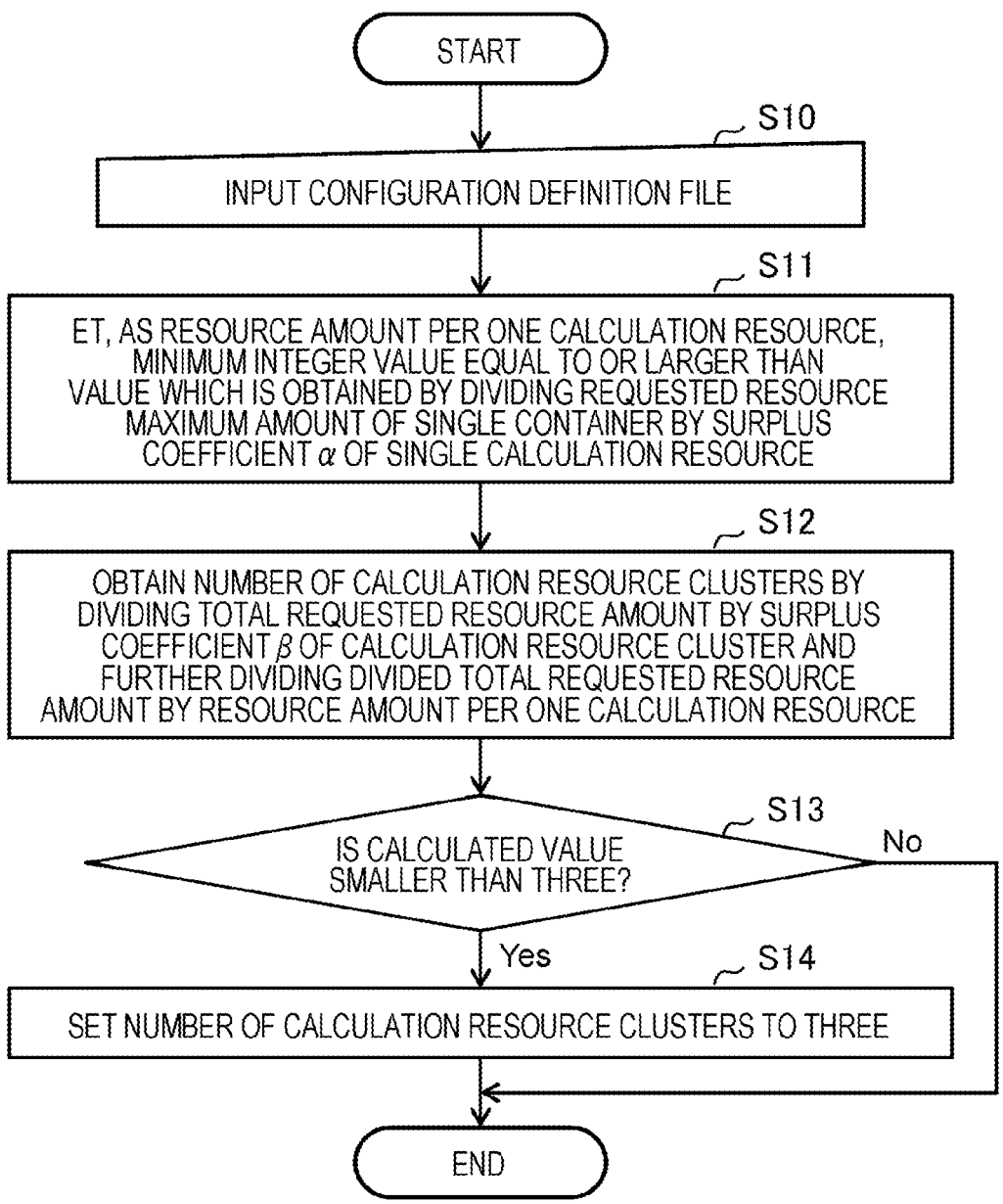
FIG. 7 is a flowchart of processing according to the first embodiment.

FIG. 7 is a flowchart of processing according to the first embodiment.

First, an administrator who manages the cluster management apparatus 2 inputs a configuration definition file (S10). The container configuration reception unit 24 receives an input of the configuration definition file.

Based on the configuration definition file of the application that is received by the container configuration reception unit 24, the calculation resource calculation unit 21 sets, as a resource amount per one calculation resource, a minimum integer value equal to or larger than a value which is obtained by dividing the requested resource maximum amount of a single container of the application by a surplus coefficient α of a single calculation resource (S11). Here, the surplus coefficient α of a single calculation resource is a predetermined coefficient.

Further, the calculation resource calculation unit 21 obtains the number of the calculation resource clusters by dividing the total requested resource amount of the application by a surplus coefficient β of a calculation resource cluster and further dividing the divided total requested resource amount of the application by the resource amount per one calculation resource (S12). Here, the calculated value is often a value including decimal places. Therefore, the number of the calculation resource clusters is an integer value rounded up to the nearest whole number. Here, the surplus coefficient β of a calculation resource cluster is a predetermined coefficient.

Next, the calculation resource calculation unit 21 determines whether or not the calculated value is smaller than three. In a case where the calculated value is smaller than three (Yes), the calculation resource calculation unit 21 proceeds to step S14, sets the number of the calculation resource clusters to three, and then ends processing of FIG. 7. In a case where the calculated value is equal to or larger than three (No), the calculation resource calculation unit 21 ends the processing of FIG. 7 while maintaining the number of the calculation resource clusters obtained in step 12 as it is.

Thereby, the calculation resource calculation unit 21 can calculate a calculation resource cluster that satisfies the constraint conditions 1 to 3. By newly adding the calculation resource calculation unit 21 to the cluster management apparatus 2, it is possible to determine a configuration of the calculation resource cluster satisfying the constraint conditions and optimize the calculation resource cluster based on the configuration definition of the application.

Figure 8:
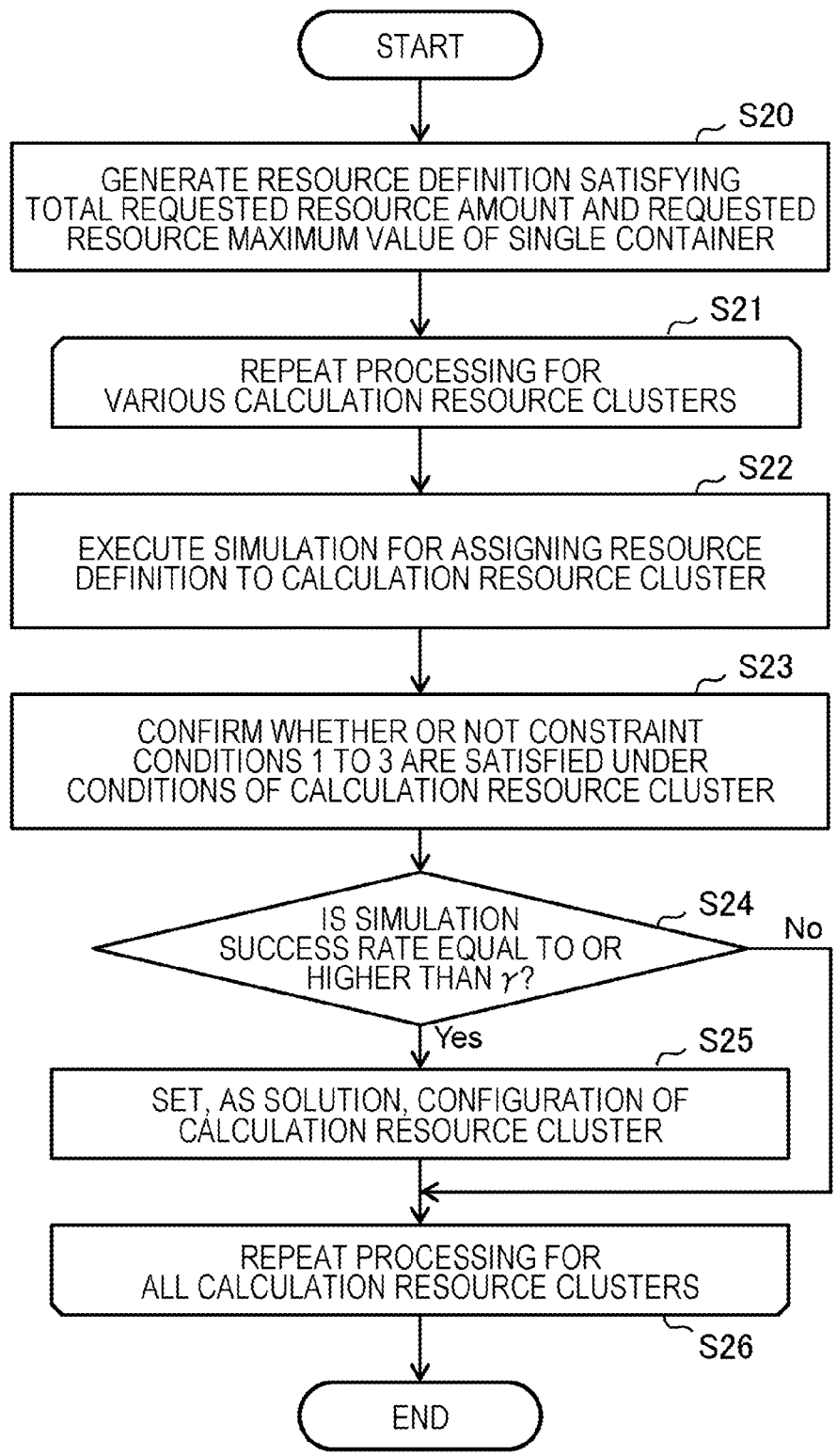
FIG. 8 is a flowchart of processing according to the second embodiment.

FIG. 8 is a flowchart of processing according to a second embodiment.

A resource definition satisfying the total requested resource amount and the requested resource maximum value of a single container is generated (S20).

In addition, the calculation resource calculation unit 21 repeats processing of step S22 to step S25 for various calculation resource clusters.

That is, the calculation resource calculation unit 21 executes a simulation for assigning the resource definition to the calculation resource cluster (S22), and confirms whether or not the constraint conditions 1 to 3 are satisfied under the conditions of the calculation resource cluster (S23).

The calculation resource calculation unit 21 determines whether or not a simulation success rate is equal to or higher than γ (S24).

In step S24, in a case where the simulation success rate is equal to or higher than γ (Yes), the calculation resource calculation unit 21 sets, as a solution, the configuration of the calculation resource cluster (S25). In a case where the simulation success rate is lower than γ (No), the calculation resource calculation unit 21 directly proceeds to step S26.

In step S26, in a case where a calculation resource cluster on which the processing of step S22 to step S25 is not performed exists, the calculation resource calculation unit 21 returns to processing of step S21. In a case where the processing of step S22 to step S25 is repeated for all the calculation resource clusters, the calculation resource calculation unit 21 ends processing of FIG. 8.

Thereby, the calculation resource calculation unit 21 can derive the configuration of the calculation resource cluster of which the simulation success rate is equal to or higher than γ. By newly adding the calculation resource calculation unit 21 to the cluster management apparatus 2, it is possible to determine a configuration of the calculation resource cluster satisfying the constraint conditions and optimize the calculation resource cluster based on the configuration definition of the application.

In determination of the configuration of the calculation resource cluster, the calculation resource calculation unit 21 derives a configuration pattern satisfying the three constraint conditions based on the three constraint conditions.

Here, as a specific example of the simulation according to the second embodiment, a case where the total requested resource amount of the application is 4000 and the requested resource maximum amount of a single container is 1000 will be described.

The calculation resource calculation unit 21 generates three patterns of the resource definition satisfying the total requested resource amount of the application and the requested resource maximum value of a single container. The number of the patterns of the resource definition is infinite. In the present embodiment, the number of the patterns satisfying the conditions may be at least one. On the other hand, as the number of the patterns increases, accuracy is improved. Thus, it is desirable to perform a simulation for many patterns.

Figure 9:
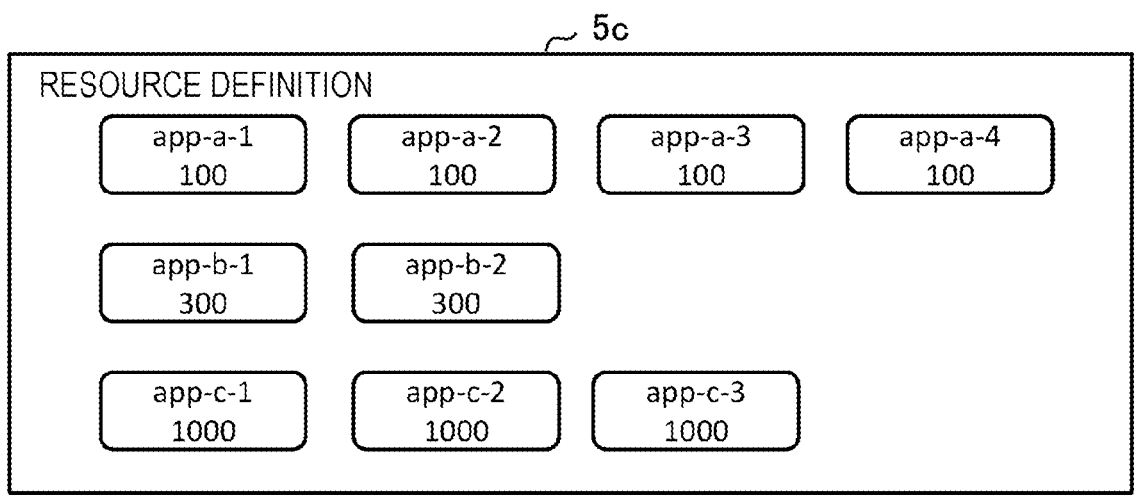
FIG. 9 is a diagram illustrating a first resource definition.

A first resource definition 5c is illustrated in FIG. 9 to be described later, and four containers related to an application a, two containers related to an application b, and three containers related to an application c are defined in order from the top.

Figure 11:
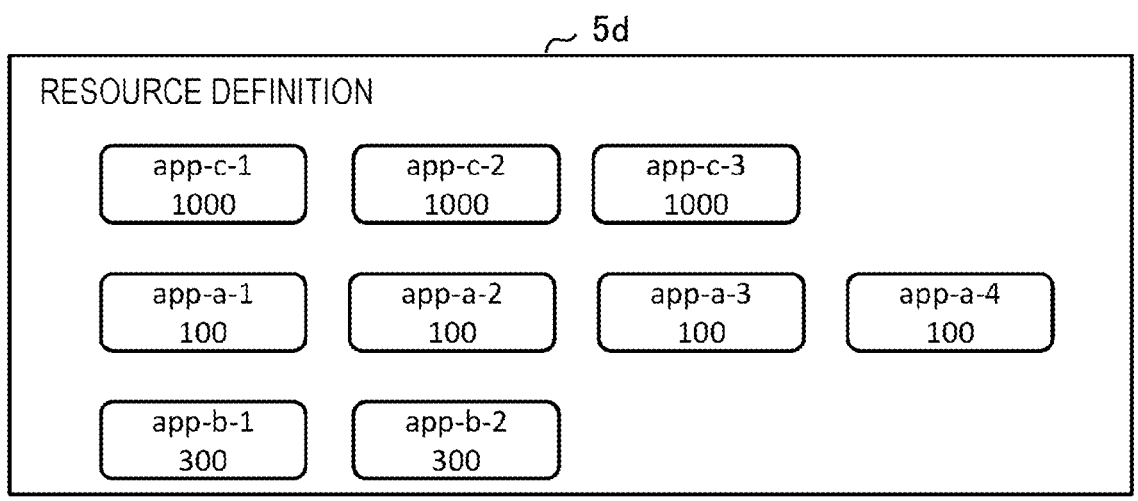
FIG. 11 is a diagram illustrating a second resource definition.

A second resource definition 5d is illustrated in FIG. 11 to be described later, and is a pattern in which elements are the same as elements of the first resource definition 5c but the order of the elements is different.

Figure 13:
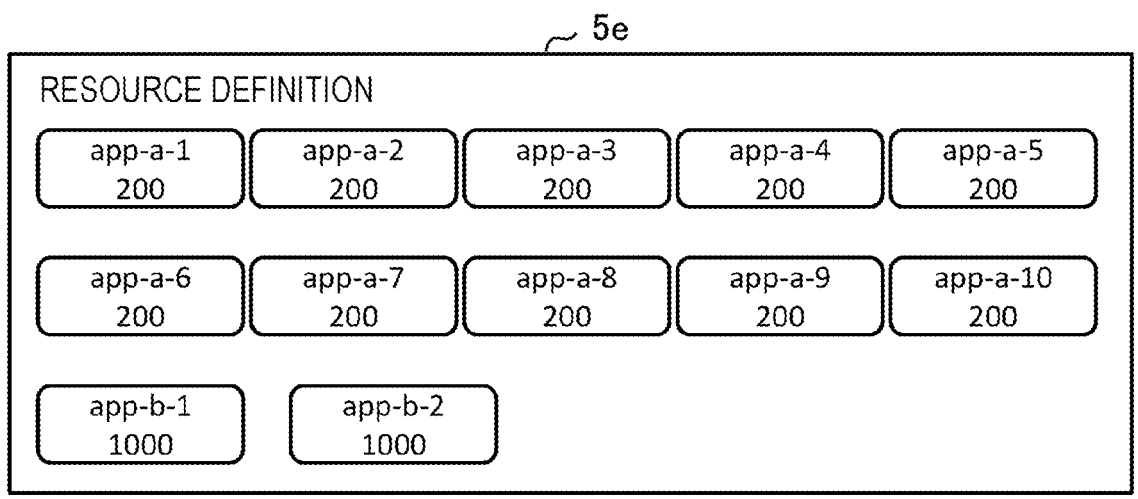
FIG. 13 is a diagram illustrating a third resource definition.

A third resource definition 5e is illustrated in FIG. 13 to be described later, and ten containers related to an application a and two containers related to an application b are defined in order from the top.

Figure 15:
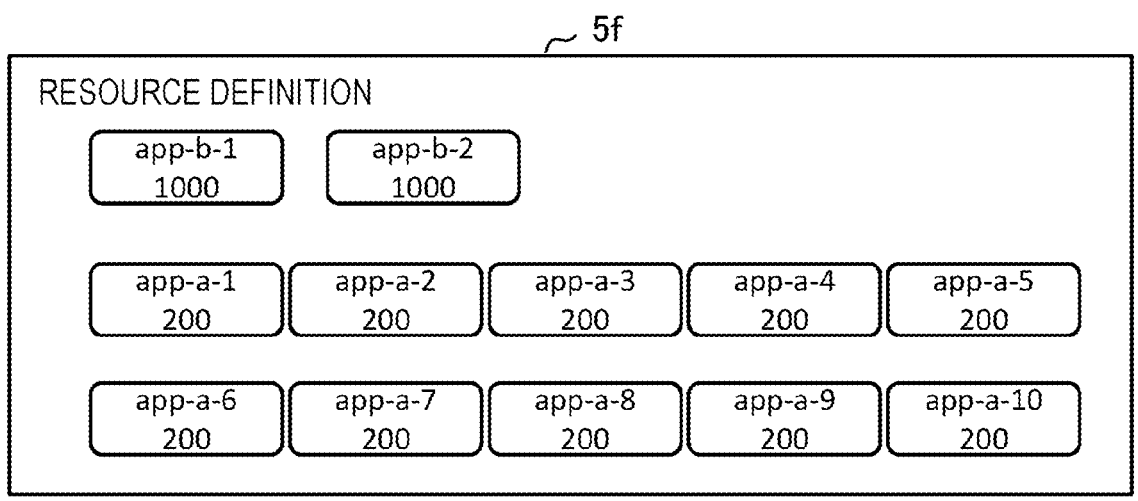
FIG. 15 is a diagram illustrating a fourth resource definition.

A fourth resource definition 5f is illustrated in FIG. 15 to be described later, and is a pattern in which elements are the same as elements of the third resource definition 5e but the order of the elements is different.

The calculation resource calculation unit 21 executes a simulation for assigning these resource definitions to various calculation resource clusters, and confirms whether or not the constraint conditions 1 to 3 are satisfied under conditions of a certain calculation resource cluster.

The calculation resource calculation unit 21 generates three types of clusters satisfying the constraint condition 1 and the constraint condition 2, as calculation resource clusters for performing a simulation.

Figure 10:
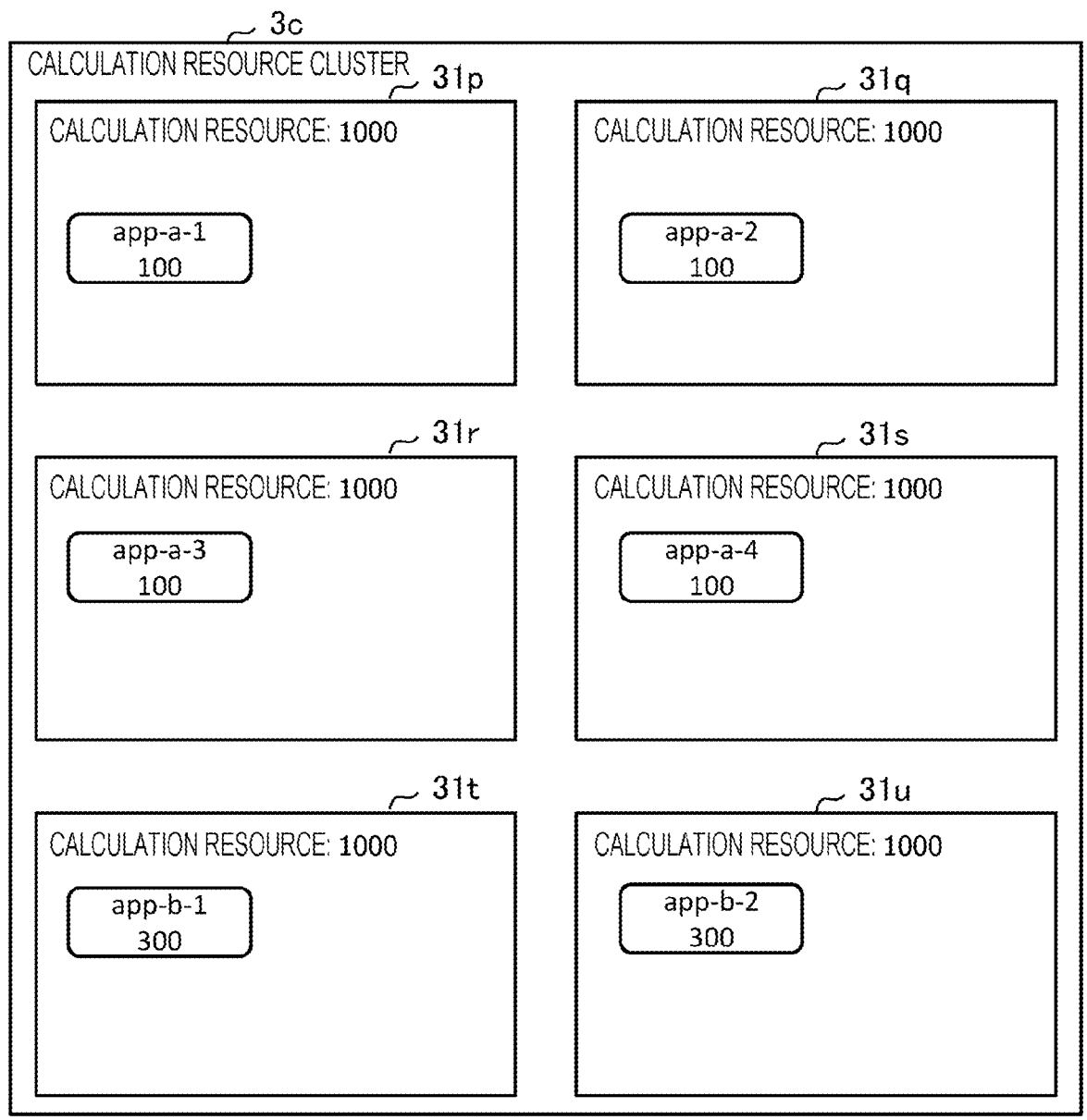
FIG. 10 is a diagram illustrating a simulation in which a first resource definition is assigned to a first calculation resource cluster.

As illustrated in FIG. 10 and the like to be described later, a first calculation resource cluster 3c includes six calculation resources 31p to 31u. Each of the calculation resources 31p to 31u has a resource amount of 1000.

Figure 18:
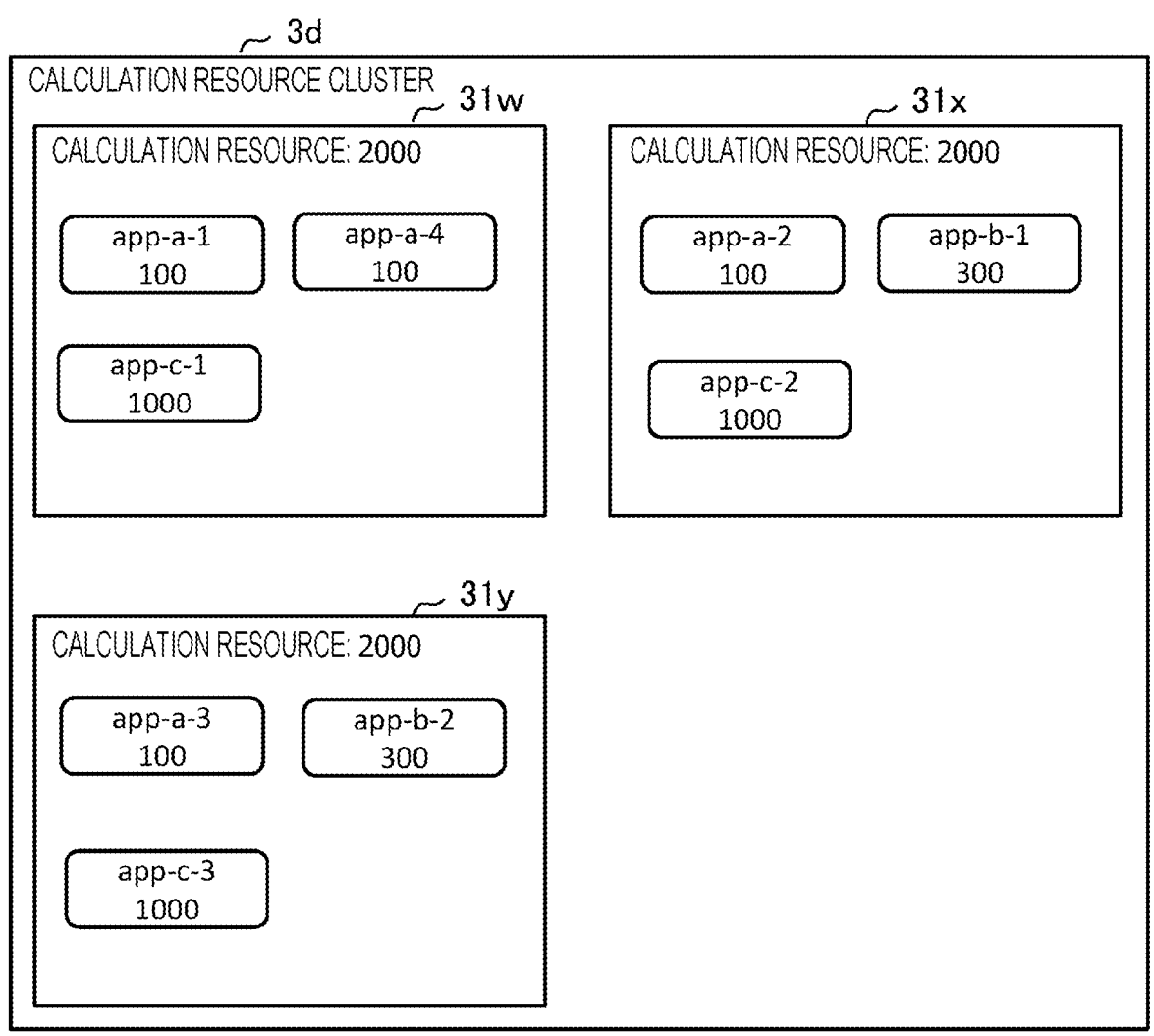
FIG. 18 is a diagram illustrating a simulation in which a first resource definition is assigned to a second calculation resource cluster.

As illustrated in FIG. 18 and the like to be described later, a second calculation resource cluster 3d includes three calculation resources 31w to 31y. Each of the calculation resources 31w to 31y has a resource amount of 2000.

Figure 26:
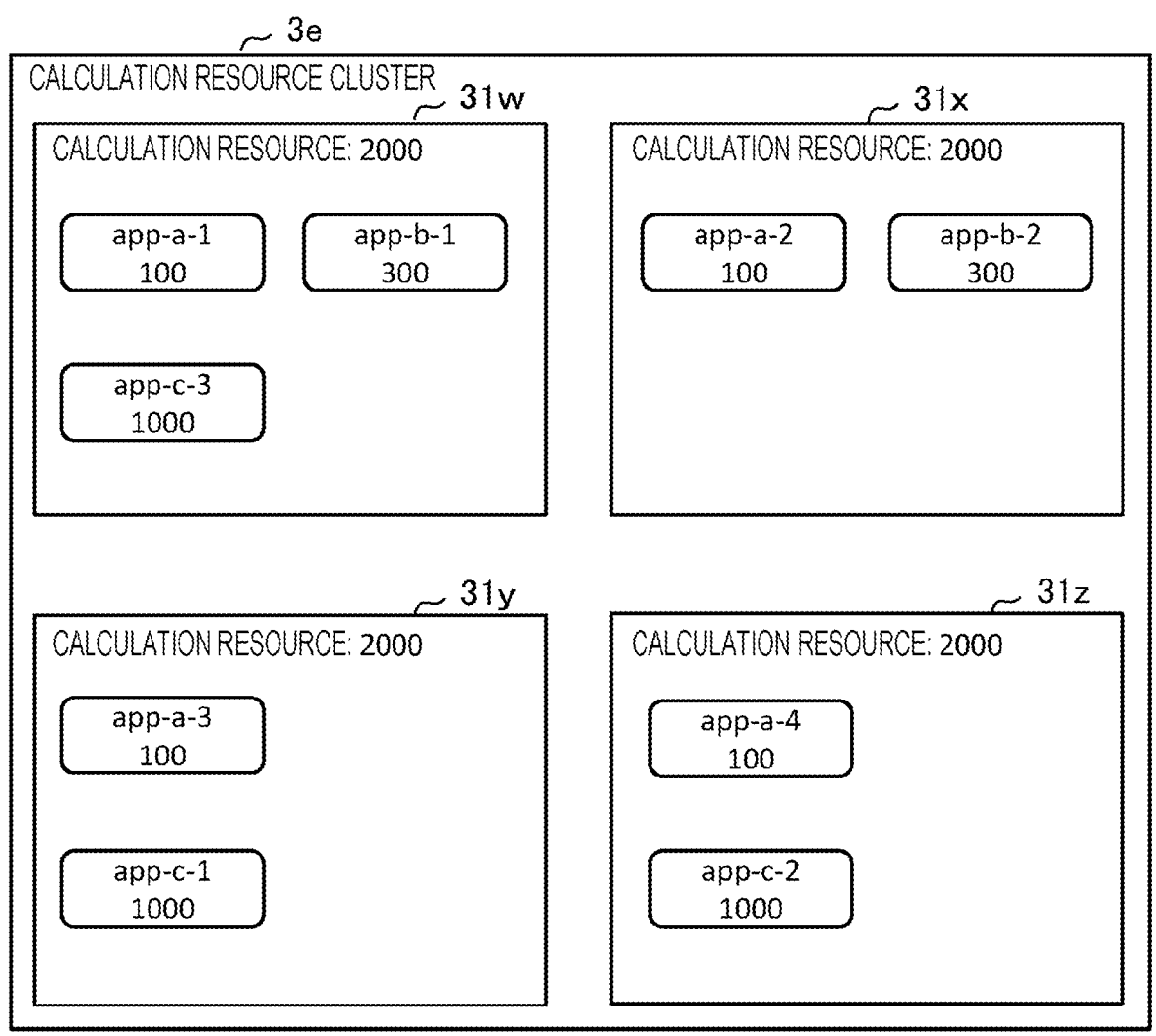
FIG. 26 is a diagram illustrating a simulation in which a first resource definition is assigned to a third calculation resource cluster.

As illustrated in FIG. 26 and the like to be described later, a third calculation resource cluster 3e includes four calculation resources 31w to 31z. Each of the calculation resources 31w to 31z has a resource amount of 2000.

The calculation resource calculation unit 21 assigns each resource definition to the first calculation resource cluster 3c to the third calculation resource cluster 3e.

FIG. 9 is a diagram illustrating the first resource definition 5c.

In the first resource definition 5c, four containers related to an application a, two containers related to an application b, and three containers related to an application c are defined in order from the top.

The four containers related to the application a are from app-a-1 to app-a-4, and each of the containers requires a resource amount of 100.

The two containers related to the application b are from app-b-1 to app-b-2, and each of the containers requires a resource amount of 300.

The three containers related to the application c are from app-c-1 to app-c-3, and each of the containers requires a resource amount of 1000.

The calculation resource calculation unit 21 evaluates the first resource definition 5c in order from the top, and performs a simulation for assigning the containers to the first calculation resource cluster 3c (refer to FIG. 10).

FIG. 10 is a diagram illustrating a simulation in which the first resource definition 5c is assigned to the first calculation resource cluster 3c.

The first calculation resource cluster 3c includes the calculation resources 31p to 31u. Each of the calculation resources 31p to 31u has a resource amount of 1000. Note that, here, the calculation resource calculation unit 21 assigns the containers of the first resource definition 5c to the calculation resources 31p to 31u in order from the calculation resource of which a remaining resource amount is largest.

The container app-a-1 is assigned to the calculation resource 31p. The container app-a-2 is assigned to the calculation resource 31q. The container app-a-3 is assigned to the calculation resource 31r. The container app-a-4 is assigned to the calculation resource 31s. The remaining resource amounts of the calculation resources 31q to 31s are 900.

The container app-b-1 is assigned to the calculation resource 31t. The container app-b-2 is assigned to the calculation resource 31u. The remaining resource amounts of the calculation resources 31t and 31u are 700.

At this time, the containers app-c-1 to app-c-3 related to the application c cannot be assigned to any of the calculation resources 31p to 31u.

FIG. 11 is a diagram illustrating the second resource definition 5d.

In the second resource definition 5d, three containers related to an application c, four containers related to an application a, and two containers related to an application b are defined in order from the top. That is, the elements of the second resource definition 5d are the same as the elements of the first resource definition 5c, but an evaluation order of the elements is different.

The three containers related to the application c are from app-c-1 to app-c-3, and each of the containers requires a resource amount of 1000.

The four containers related to the application a are from app-a-1 to app-a-4, and each of the containers requires a resource amount of 100.

The two containers related to the application b are from app-b-1 to app-b-2, and each of the containers requires a resource amount of 300.

Figure 12:
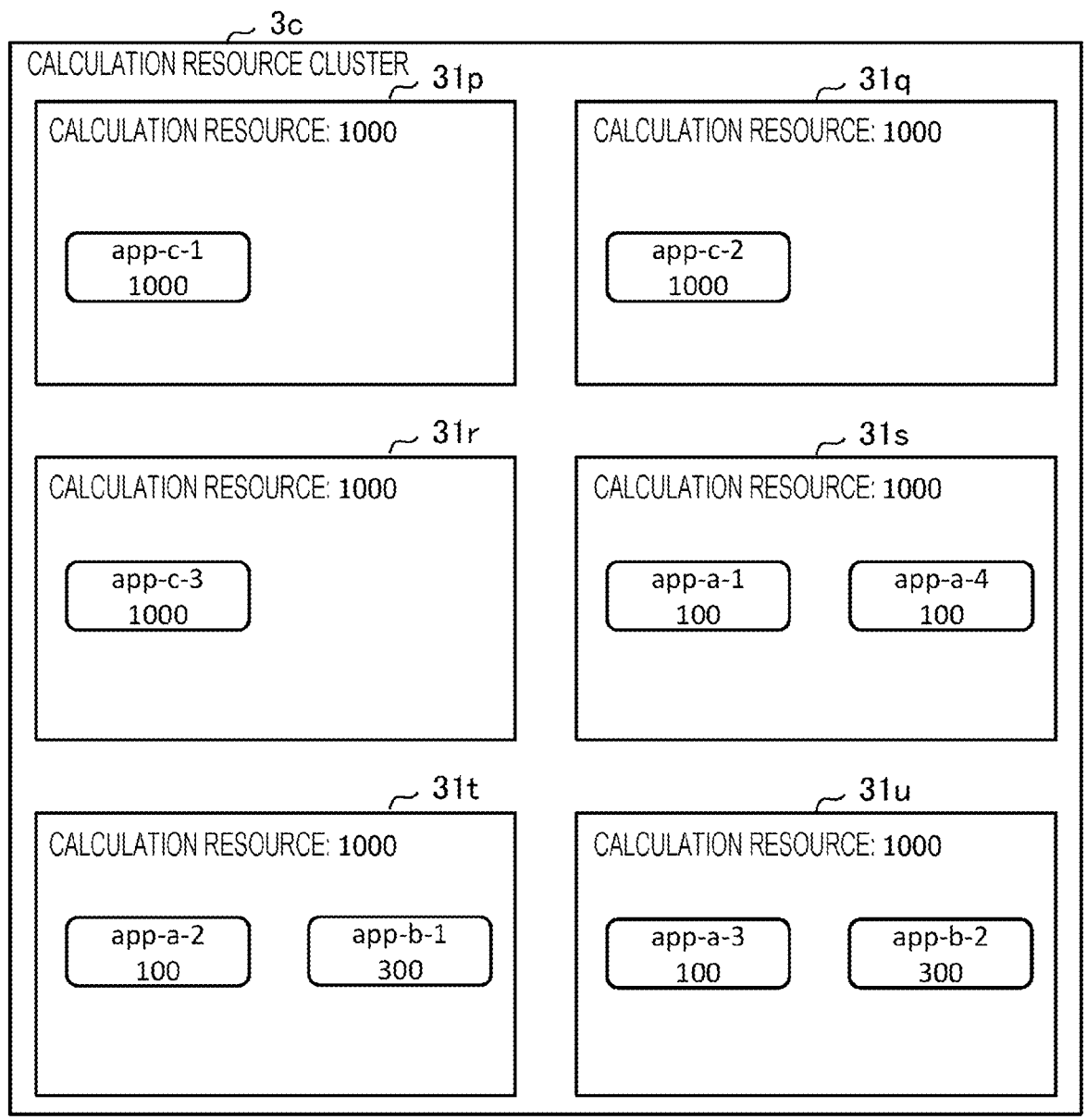
FIG. 12 is a diagram illustrating a simulation in which a second resource definition is assigned to a first calculation resource cluster.

The calculation resource calculation unit 21 evaluates the second resource definition 5d in order from the top, and performs a simulation for assigning the containers to the first calculation resource cluster 3c (refer to FIG. 12).

FIG. 12 is a diagram illustrating a simulation in which the second resource definition 5d is assigned to the first calculation resource cluster 3c.

The container app-c-1 is assigned to the calculation resource 31p. The container app-c-2 is assigned to the calculation resource 31q. The container app-c-3 is assigned to the calculation resource 31r. The remaining resource amounts of the calculation resources 31q to 31r are 0.

The containers app-a-1 and app-a-4 are assigned to the calculation resource 31s. The remaining resource amount of the calculation resource 31s is 800.

The containers app-a-2 and app-b-1 are assigned to the calculation resource 31t. The containers app-a-3 and app-b-2 are assigned to the calculation resource 31u. The remaining resource amounts of the calculation resources 31t and 31u are 600.

At this time, all containers related to the second resource definition 5d can be assigned to any one of the calculation resources 31p to 31u of the first calculation resource cluster 3c.

FIG. 13 is a diagram illustrating the third resource definition 5e.

In the third resource definition 5e, ten containers related to an application a and two containers related to an application b are defined in order from the top.

The ten containers related to the application a are from app-a-1 to app-a-10, and each of the containers requires a resource amount of 200.

The two containers related to the application b are from app-b-1 to app-b-2, and each of the containers requires a resource amount of 1000.

Figure 14:
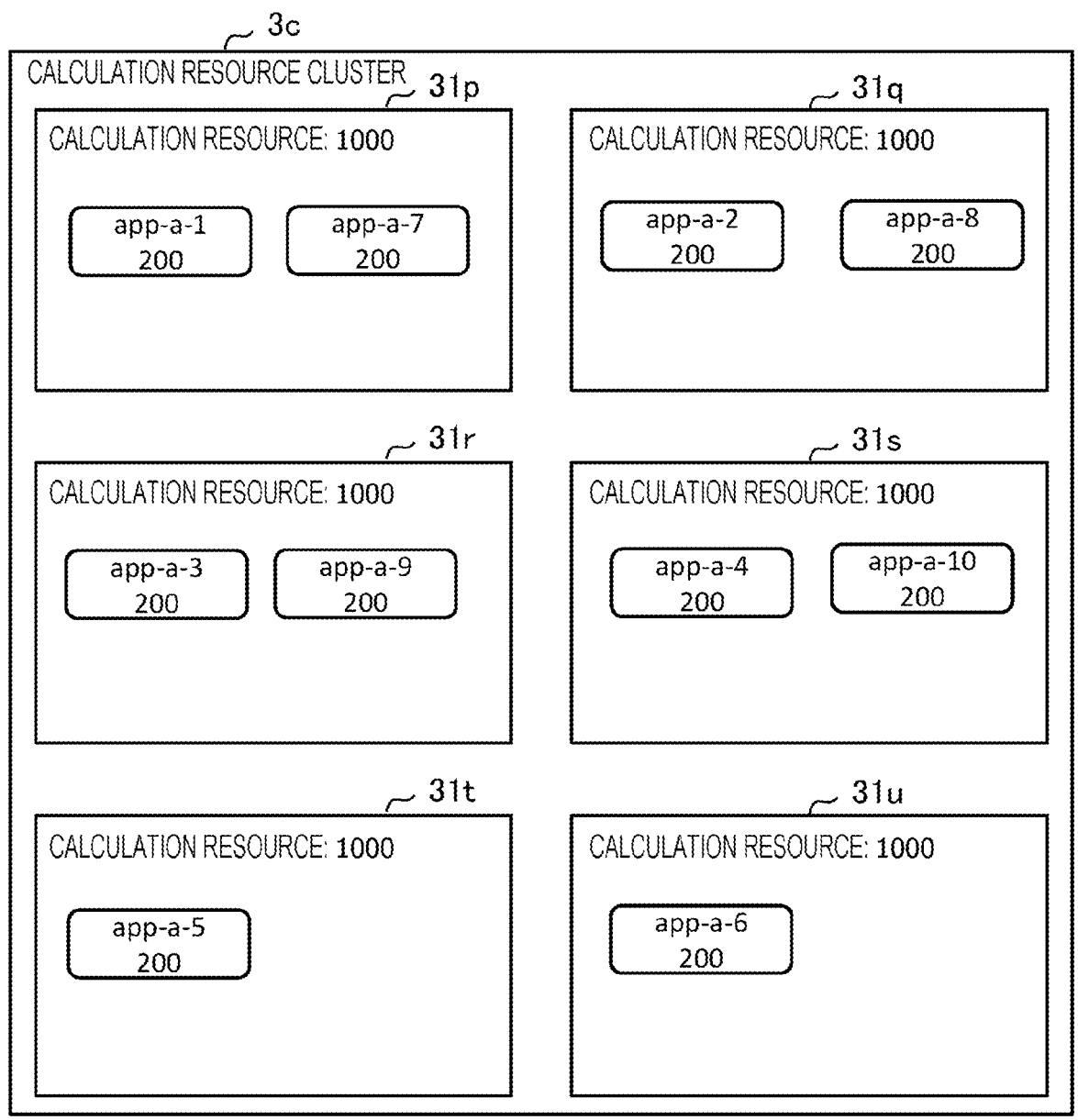
FIG. 14 is a diagram illustrating a simulation in which a third resource definition is assigned to a first calculation resource cluster.

The calculation resource calculation unit 21 evaluates the third resource definition 5e in order from the top, and performs a simulation for assigning the containers to the first calculation resource cluster 3c (refer to FIG. 14). Note that, here, the calculation resource calculation unit 21 assigns the containers to the calculation resources 31p to 31u of the first calculation resource cluster 3c in order from the calculation resource of which a remaining resource amount is largest.

FIG. 14 is a diagram illustrating a simulation in which the third resource definition 5e is assigned to the first calculation resource cluster 3c.

The containers app-a-1 and app-a-7 are assigned to the calculation resource 31p. The containers app-a-2 and app-a-8 are assigned to the calculation resource 31q. The containers app-a-3 and app-a-9 are assigned to the calculation resource 31r. The containers app-a-4 and app-a-10 are assigned to the calculation resource 31s. The remaining resource amounts of the calculation resources 31p to 31s are 600.

The container app-a-5 is assigned to the calculation resource 31t. The container app-a-6 is assigned to the calculation resource 31u. The remaining resource amounts of the calculation resources 31t and 31u are 800.

At this time, the containers app-b-1 to app-b-2 related to the application b cannot be assigned to any of the calculation resources 31p to 31u.

FIG. 15 is a diagram illustrating the fourth resource definition 5f.

In the fourth resource definition 5f, two containers related to an application b and ten containers related to an application a are defined in order from the top. The elements of the fourth resource definition 5f are the same as the elements of the third resource definition 5e, but an evaluation order of the elements is different.

The two containers related to the application b are from app-b-1 to app-b-2, and each of the containers requires a resource amount of 1000.

The ten containers related to the application a are from app-a-1 to app-a-10, and each of the containers requires a resource amount of 200.

Figure 16:
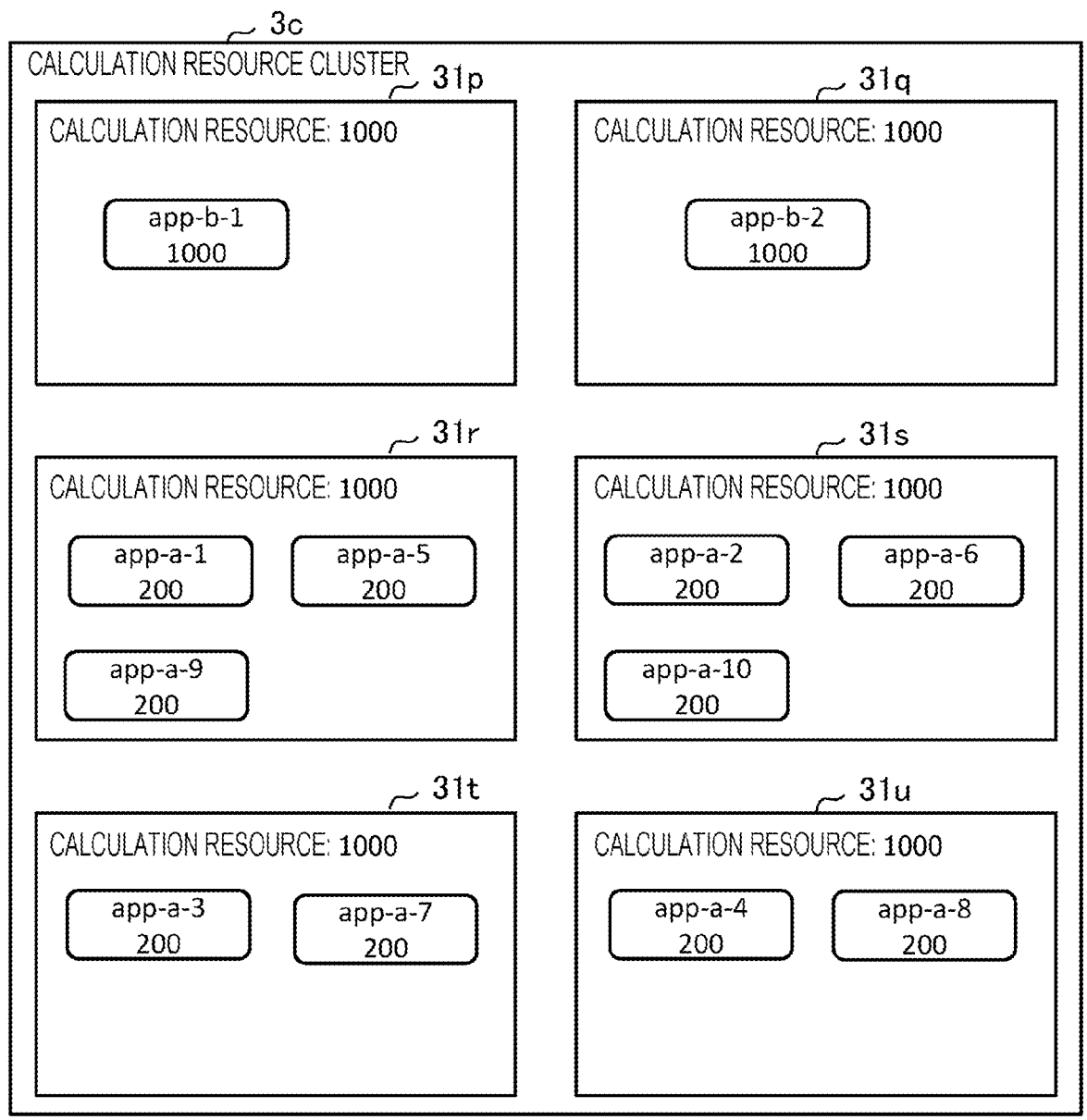
FIG. 16 is a diagram illustrating a simulation in which a fourth resource definition is assigned to a first calculation resource cluster.

The calculation resource calculation unit 21 evaluates the fourth resource definition 5f in order from the top, and performs a simulation for assigning the containers to the first calculation resource cluster 3c (refer to FIG. 16).

FIG. 16 is a diagram illustrating a simulation in which the fourth resource definition 5f is assigned to the first calculation resource cluster 3c.

The container app-b-1 is assigned to the calculation resource 31p. The container app-b-2 is assigned to the calculation resource 31q. The remaining resource amounts of the calculation resources 31p and 31q are 0.

The containers app-a-1, app-a-5, and app-a-9 are assigned to the calculation resource 31r. The containers app-a-2, app-a-6, and app-a-10 are assigned to the calculation resource 31s. The remaining resource amounts of the calculation resources 31r and 31s are 400.

The containers app-a-3 and app-a-7 are assigned to the calculation resource 31t. The containers app-a-4 and app-a-8 are assigned to the calculation resource 31u. The remaining resource amounts of the calculation resources 31t and 31u are 600.

At this time, all containers related to the second resource definition 5d can be assigned to any one of the calculation resources 31p to 31u of the first calculation resource cluster 3c.

Figure 17:
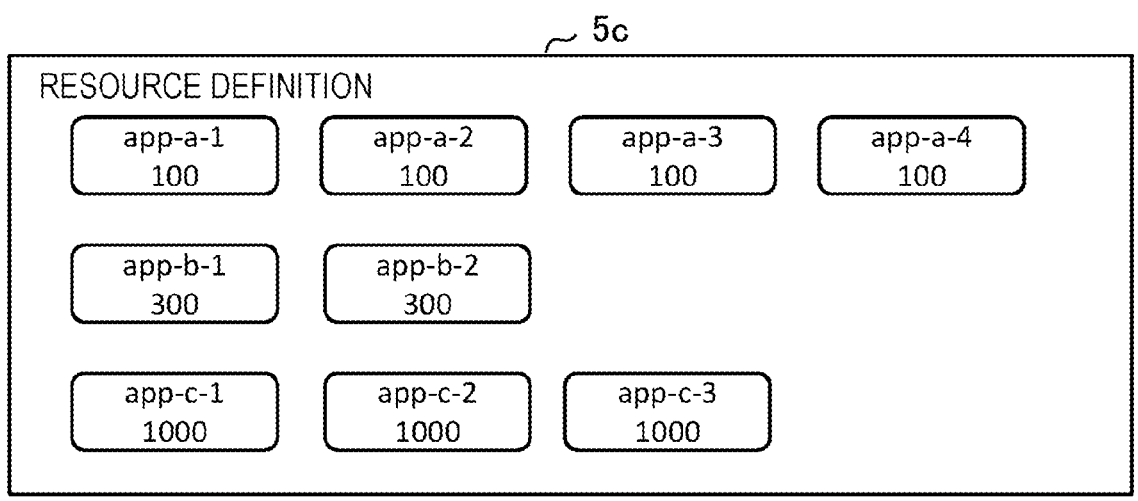
FIG. 17 is a diagram illustrating a first resource definition.

FIG. 17 is a diagram illustrating the first resource definition 5c, and is similar to FIG. 9 described above.

FIG. 18 is a diagram illustrating a simulation in which the first resource definition 5c is assigned to the second calculation resource cluster 3d.

The second calculation resource cluster 3d includes the calculation resources 31w to 31y. Each of the calculation resources 31w to 31y has a resource amount of 2000. Note that, here, the calculation resource calculation unit 21 assigns the containers of the second resource definition 5d to the calculation resources 31w to 31y in order from the calculation resource of which a remaining resource amount is largest.

The containers app-a-1, app-a-4, and app-c-1 are assigned to the calculation resource 31w. The remaining resource amount of the calculation resource 31w is 800.

The containers app-a-2, app-b-1, and app-c-2 are assigned to the calculation resource 31x. The remaining resource amount of the calculation resource 31x is 600.

The containers app-a-3, app-b-2, and app-c-2 are assigned to the calculation resource 31y. The remaining resource amount of the calculation resource 31y is 600.

At this time, all containers related to the first resource definition 5c can be assigned to any one of the calculation resources 31w to 31y of the second calculation resource cluster 3d.

Figure 19:
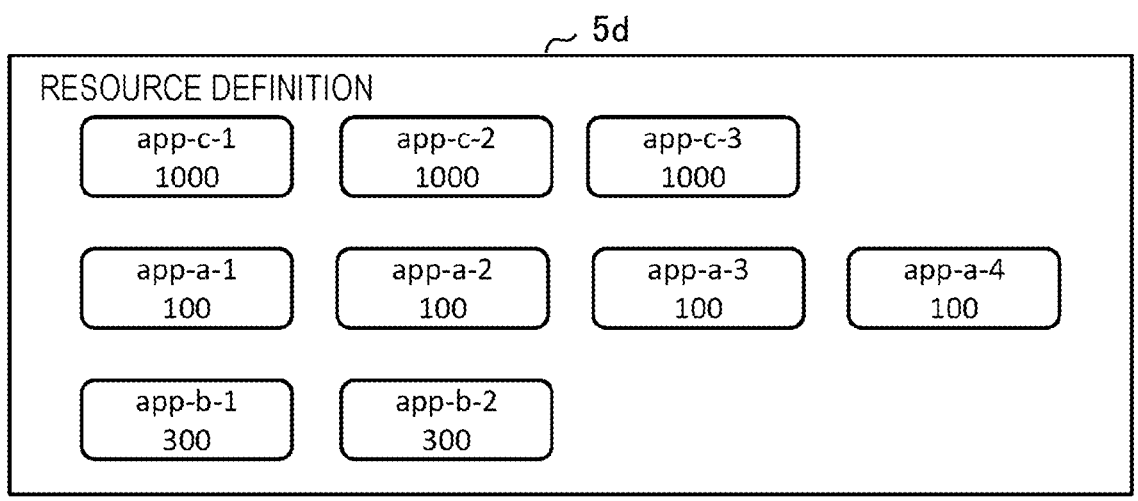
FIG. 19 is a diagram illustrating a second resource definition.

FIG. 19 is a diagram illustrating the second resource definition 5d, and is similar to FIG. 11 described above.

Figure 20:
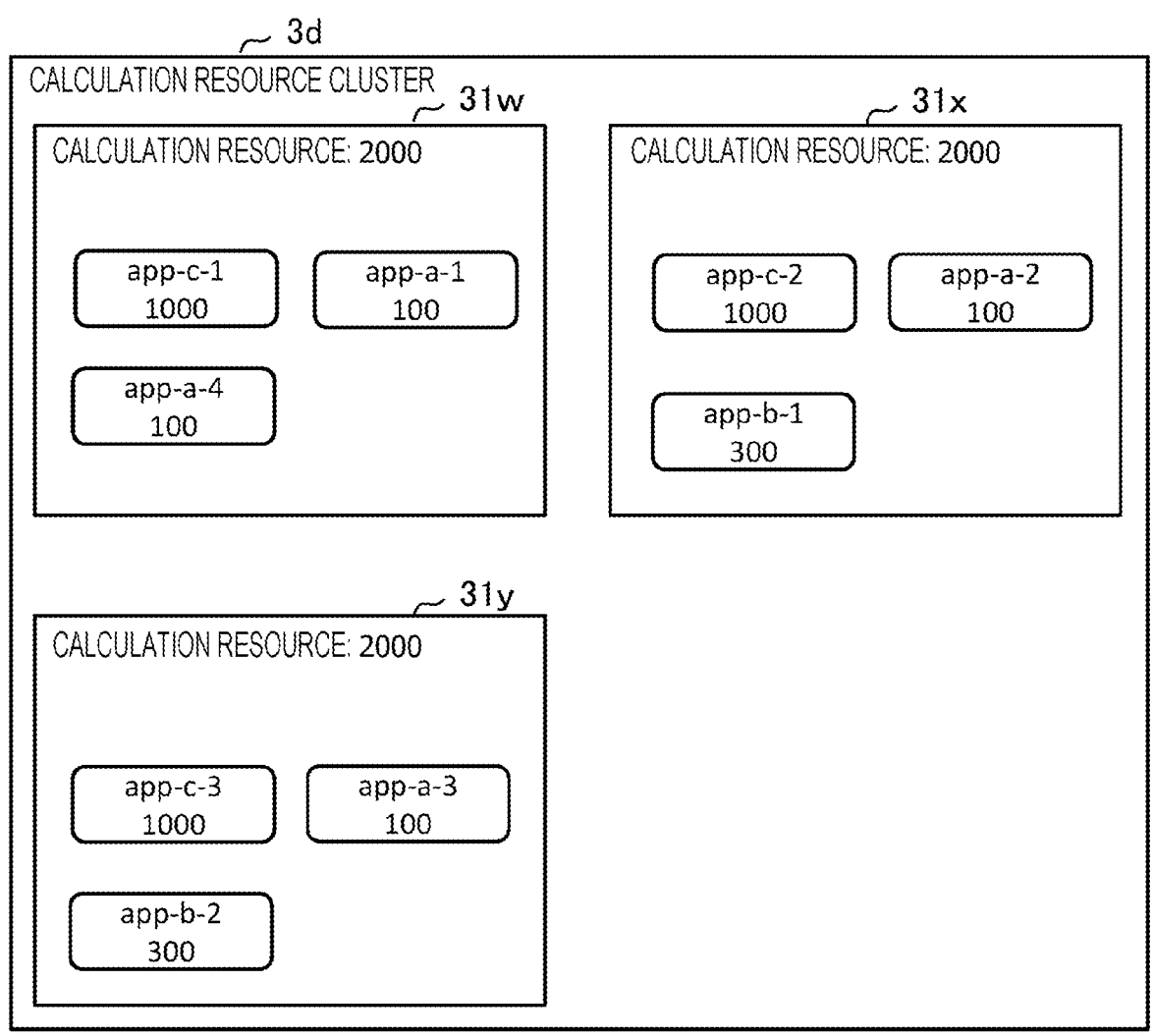
FIG. 20 is a diagram illustrating a simulation in which a second resource definition is assigned to a second calculation resource cluster.

FIG. 20 is a diagram illustrating a simulation in which the second resource definition 5d is assigned to the second calculation resource cluster 3d.

The containers app-c-1, app-a-1, and app-a-4 are assigned to the calculation resource 31w. The remaining resource amount of the calculation resource 31w is 800.

The containers app-c-2, app-a-2, and app-b-1 are assigned to the calculation resource 31x. The remaining resource amount of the calculation resource 31x is 600.

The containers app-c-3, app-a-3, and app-b-2 are assigned to the calculation resource 31y. The remaining resource amount of the calculation resource 31y is 600.

At this time, all containers related to the second resource definition 5d can be assigned to any one of the calculation resources 31w to 31y of the second calculation resource cluster 3d.

Figure 21:
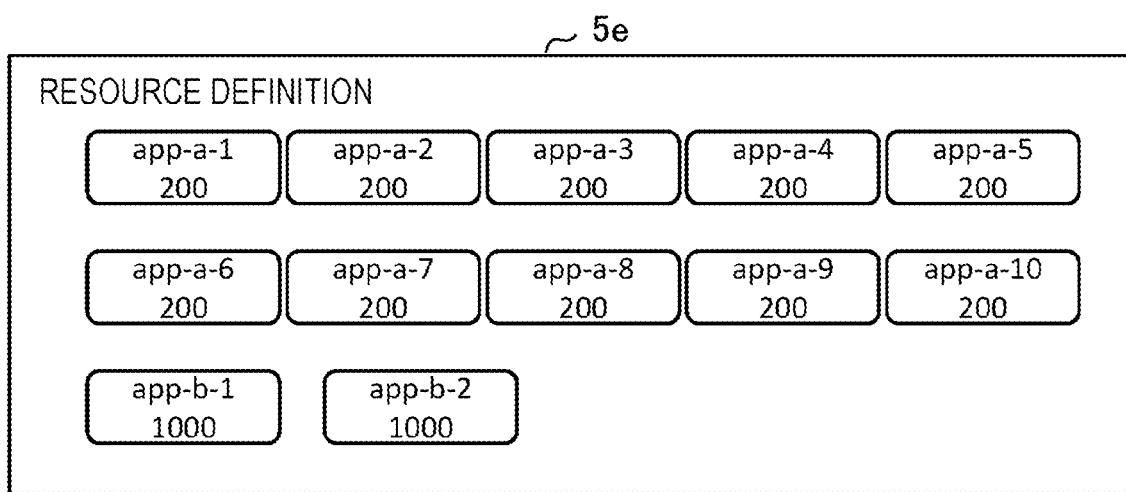
FIG. 21 is a diagram illustrating a third resource definition.

FIG. 21 is a diagram illustrating the third resource definition 5e, and is similar to FIG. 13 described above.

Figure 22:
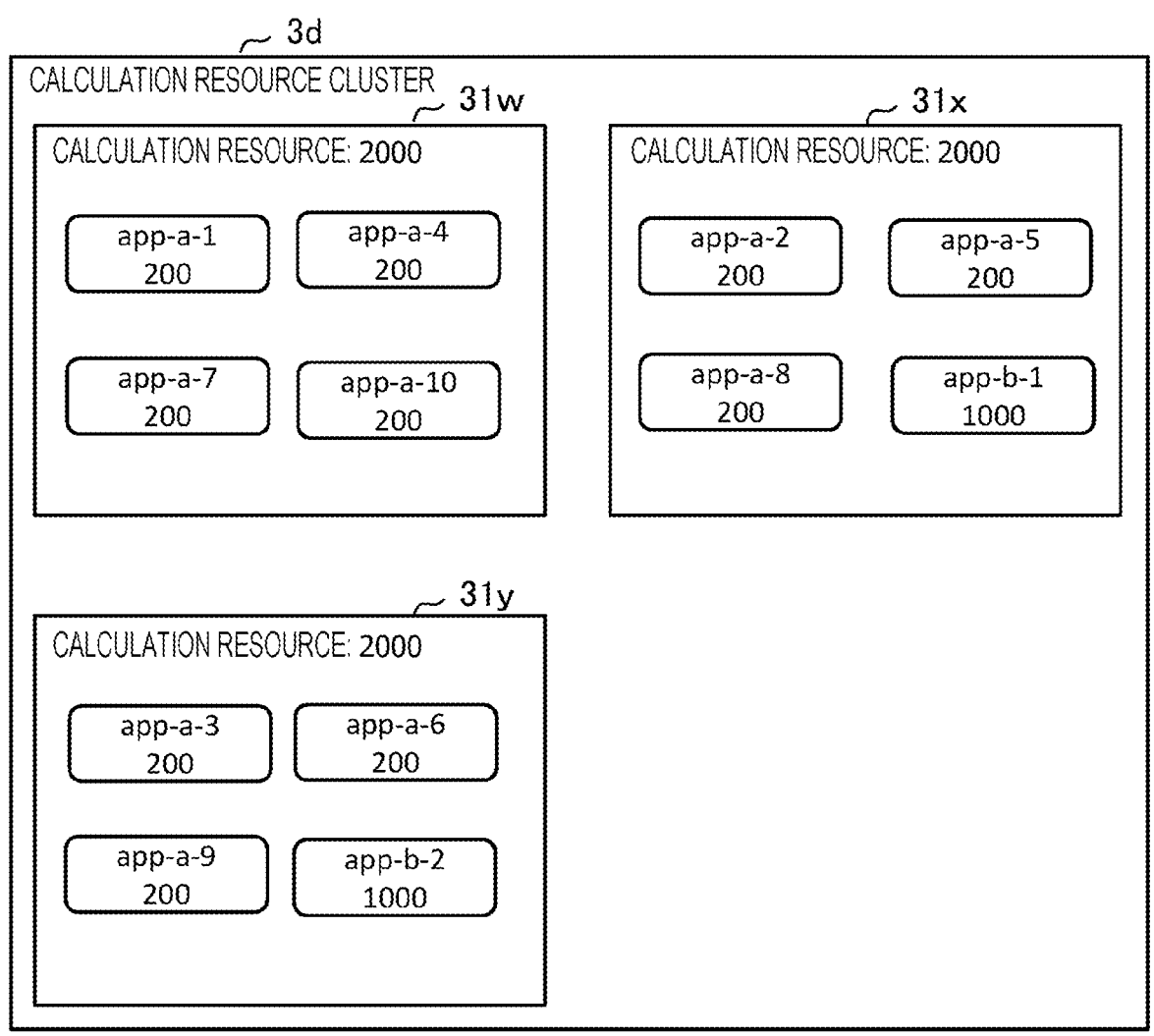
FIG. 22 is a diagram illustrating a simulation in which a third resource definition is assigned to a second calculation resource cluster.

FIG. 22 is a diagram illustrating a simulation in which the third resource definition 5e is assigned to the second calculation resource cluster 3d.

The containers app-a-1, app-a-4, app-a-7, and app-a-10 are assigned to the calculation resource 31w. The remaining resource amount of the calculation resource 31w is 1200.

The containers app-a-2, app-a-5, app-a-8, and app-b-1 are assigned to the calculation resource 31x. The remaining resource amount of the calculation resource 31x is 400.

The containers app-a-3, app-a-6, app-a-9, and app-b-2 are assigned to the calculation resource 31y. The remaining resource amount of the calculation resource 31y is 400.

At this time, all containers related to the second resource definition 5d can be assigned to any one of the calculation resources 31w to 31y of the second calculation resource cluster 3d.

Figure 23:
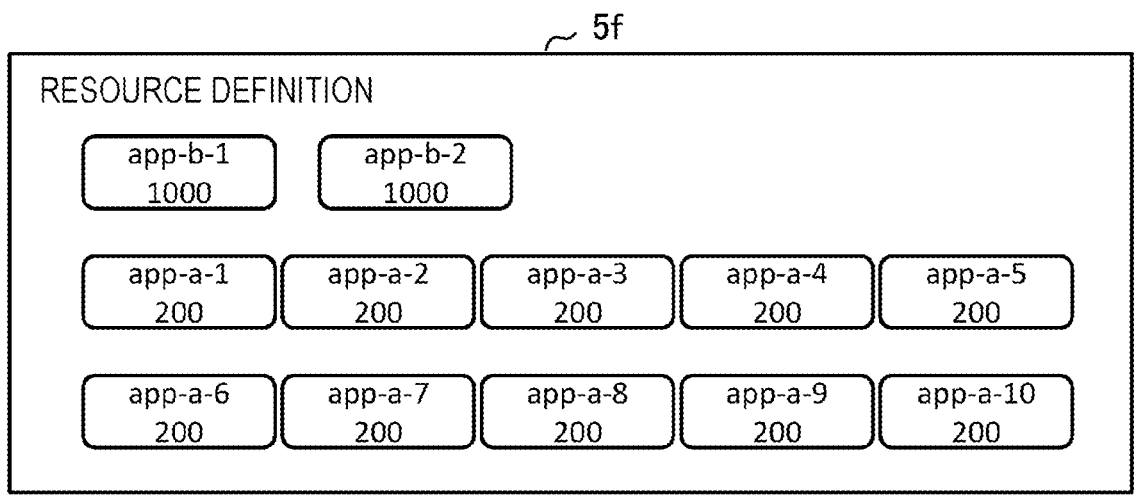
FIG. 23 is a diagram illustrating a fourth resource definition.

FIG. 23 is a diagram illustrating the fourth resource definition 5f, and is similar to FIG. 15 described above.

Figure 24:
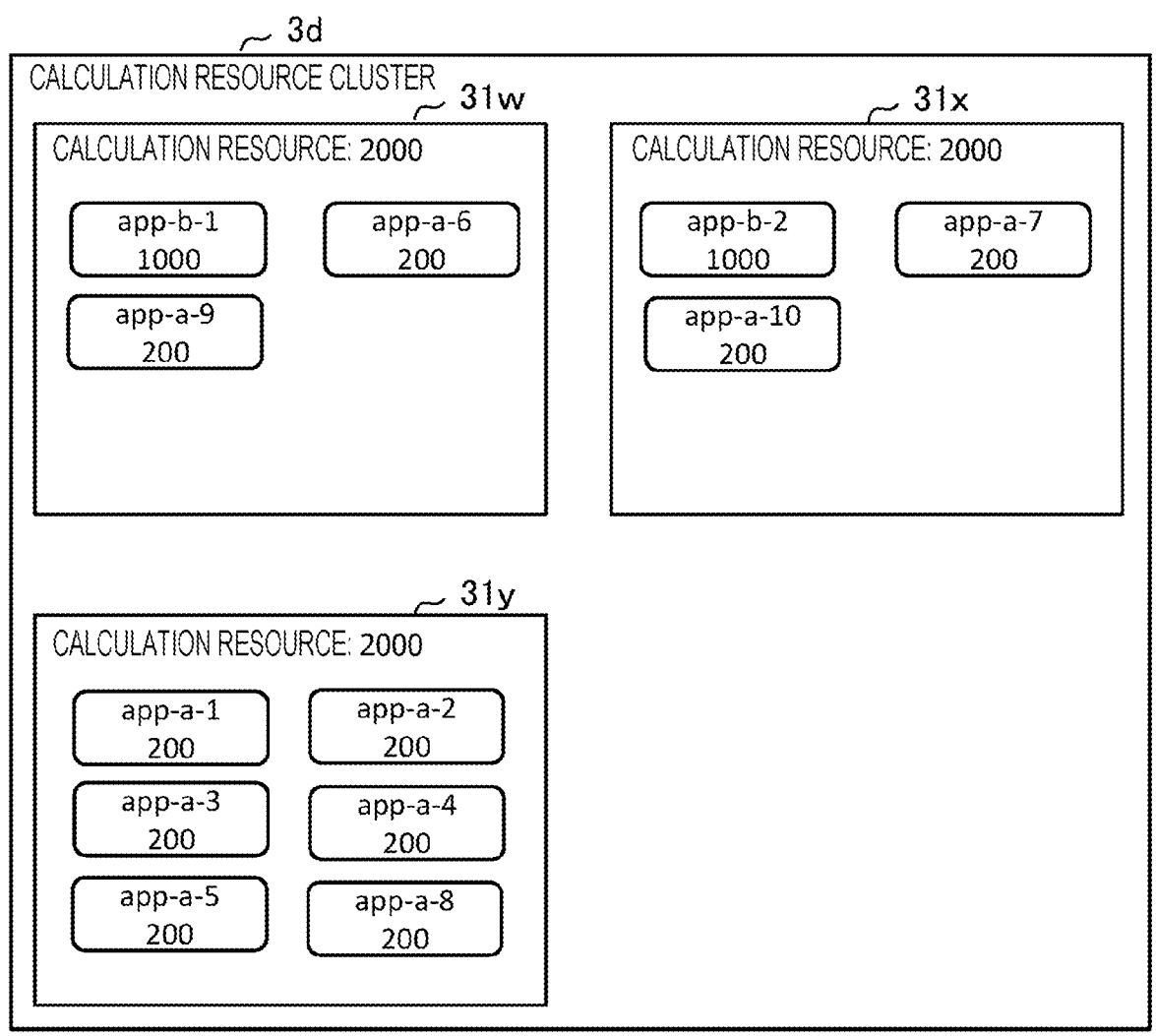
FIG. 24 is a diagram illustrating a simulation in which a fourth resource definition is assigned to a second calculation resource cluster.

FIG. 24 is a diagram illustrating a simulation in which the fourth resource definition 5f is assigned to the second calculation resource cluster 3d.

The containers app-b-1, app-a-6, and app-a-9 are assigned to the calculation resource 31w. The remaining resource amount of the calculation resource 31w is 600.

The containers app-b-2, app-a-7, and app-a-10 are assigned to the calculation resource 31x. The remaining resource amount of the calculation resource 31x is 400.

The containers app-a-1 to app-a-5 and app-a-8 are assigned to the calculation resource 31y. The remaining resource amount of the calculation resource 31y is 800.

At this time, all containers related to the second resource definition 5d can be assigned to any one of the calculation resources 31w to 31y of the second calculation resource cluster 3d.

Figure 25:
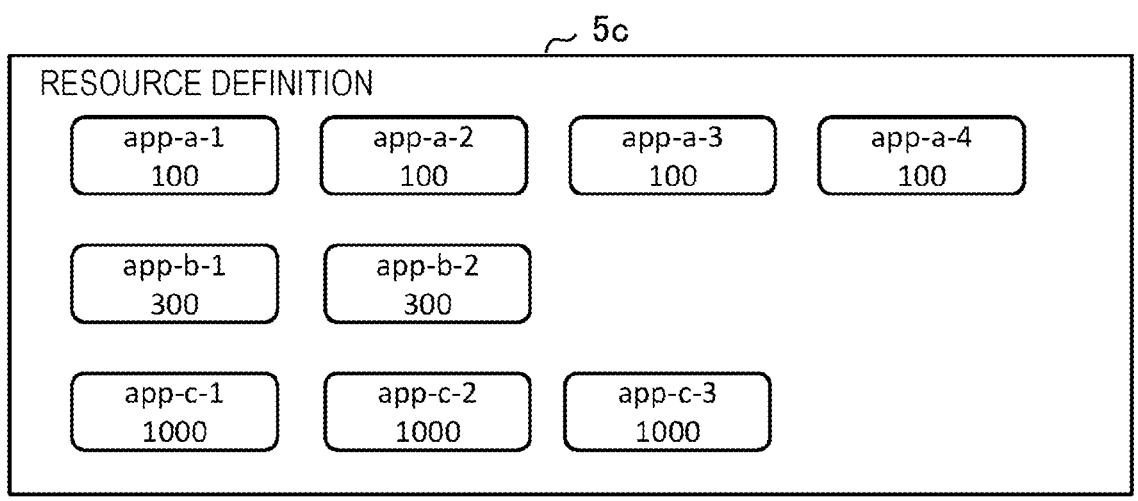
FIG. 25 is a diagram illustrating a first resource definition.

FIG. 25 is a diagram illustrating the first resource definition 5c, and is similar to FIG. 9 described above.

FIG. 26 is a diagram illustrating a simulation in which the first resource definition 5c is assigned to the third calculation resource cluster 3e.

The third calculation resource cluster $3e$ includes the calculation resources $31w$ to $31z$. Each of the calculation resources $31w$ to $31z$ has a resource amount of 2000. Note that, here, the calculation resource calculation unit 21 assigns the containers of the third resource definition $5e$ to the calculation resources $31w$ to $31z$ in order from the calculation resource of which a remaining resource amount is largest.

The containers app-a-1, app-b-1, and app-c-3 are assigned to the calculation resource $31w$. The remaining resource amount of the calculation resource $31w$ is 600.

The containers app-a-2 and app-b-2 are assigned to the calculation resource $31x$. The remaining resource amount of the calculation resource $31x$ is 1600.

The containers app-a-3 and app-c-1 are assigned to the calculation resource $31y$. The remaining resource amount of the calculation resource $31y$ is 900.

The containers app-a-4 and app-c-2 are assigned to the calculation resource $31z$. The remaining resource amount of the calculation resource $31Z$ is 900.

At this time, all containers related to the first resource definition $5c$ can be assigned to any one of the calculation resources $31w$ to $31z$ of the third calculation resource cluster $3e$.

Figure 27:
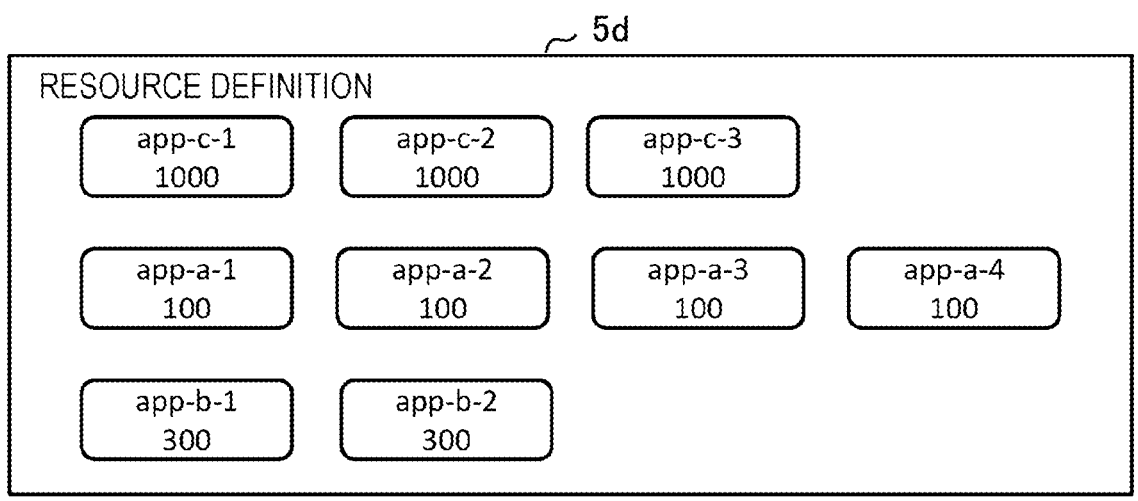
FIG. 27 is a diagram illustrating a second resource definition.

FIG. 27 is a diagram illustrating the second resource definition $5d$, and is similar to FIG. 11 described above.

Figure 28:
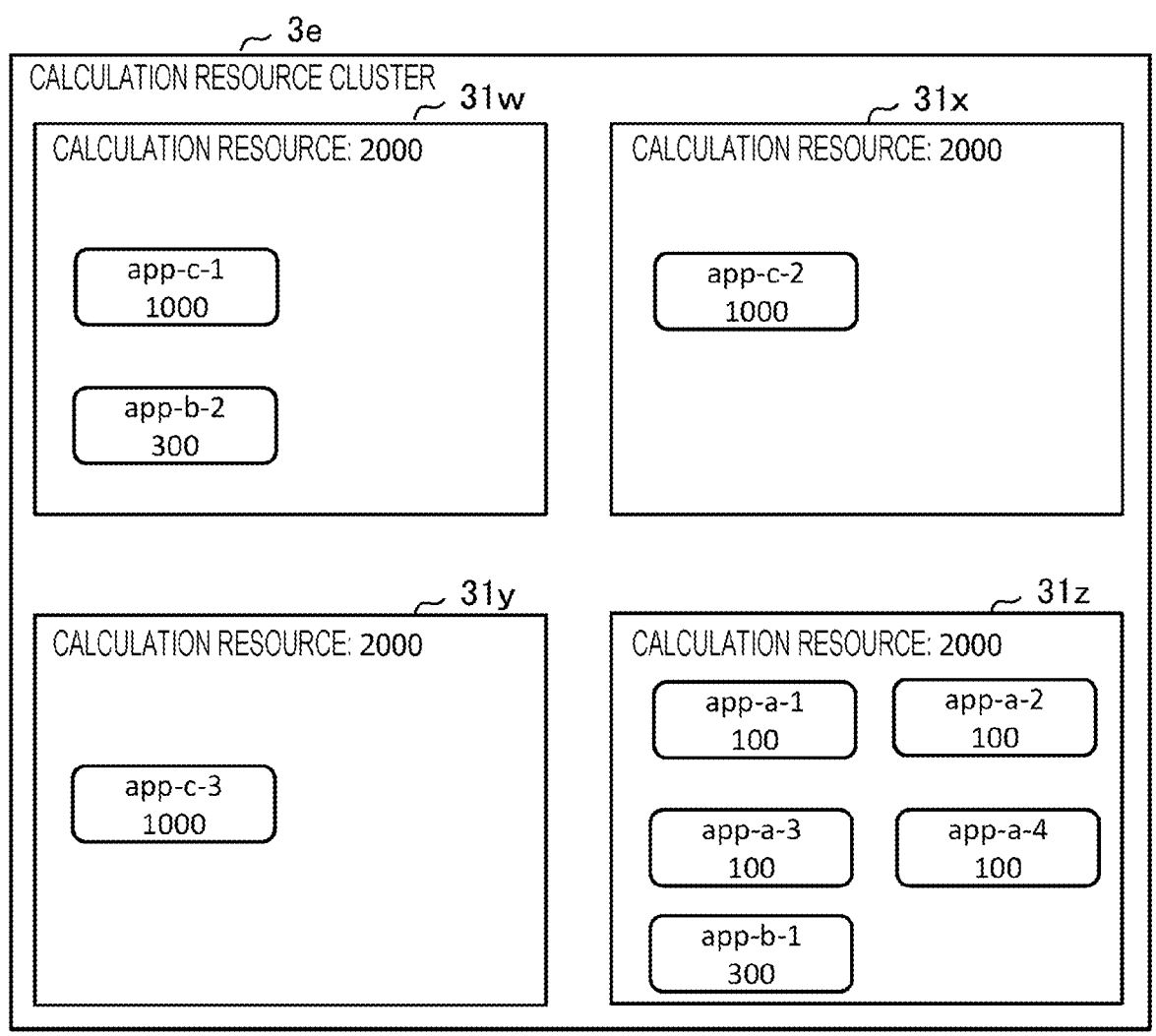
FIG. 28 is a diagram illustrating a simulation in which a second resource definition is assigned to a third calculation resource cluster.

FIG. 28 is a diagram illustrating a simulation in which the second resource definition $5d$ is assigned to the third calculation resource cluster $3e$.

The containers app-c-1 and app-b-2 are assigned to the calculation resource $31w$. The remaining resource amount of the calculation resource $31w$ is 700.

The container app-c-2 is assigned to the calculation resource $31x$. The remaining resource amount of the calculation resource $31x$ is 1000.

The container app-c-3 is assigned to the calculation resource $31y$. The remaining resource amount of the calculation resource $31y$ is 1000.

The containers app-a-1 to app-a-4 and app-b-1 are assigned to the calculation resource $31z$. The remaining resource amount of the calculation resource $31z$ is 1300.

At this time, all containers related to the second resource definition $5d$ can be assigned to any one of the calculation resources $31w$ to $31z$ of the third calculation resource cluster $3e$.

Figure 29:
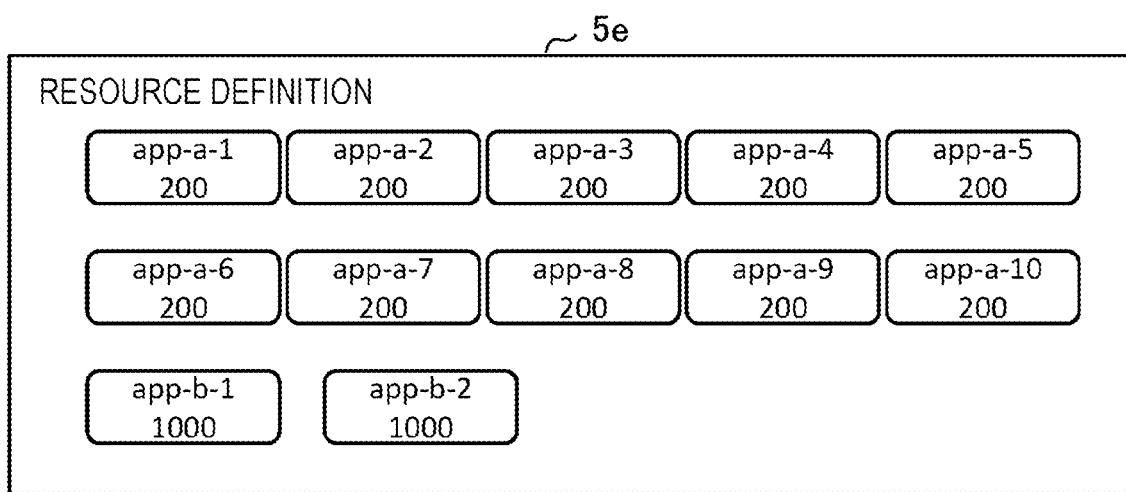
FIG. 29 is a diagram illustrating a third resource definition.

FIG. 29 is a diagram illustrating the third resource definition $5e$, and is similar to FIG. 13 described above.

Figure 30:
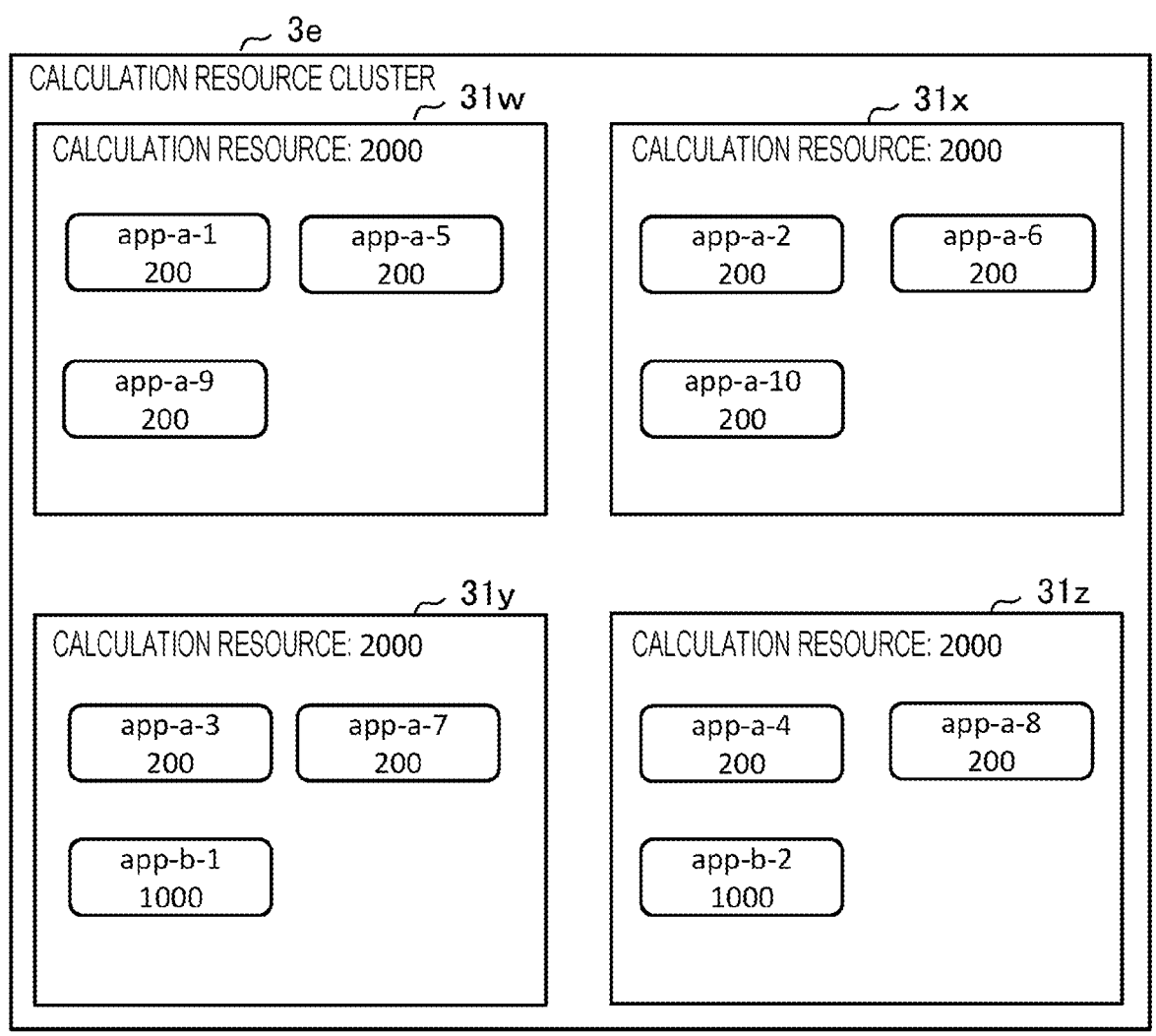
FIG. 30 is a diagram illustrating a simulation in which a third resource definition is assigned to a third calculation resource cluster.

FIG. 30 is a diagram illustrating a simulation in which the third resource definition $5e$ is assigned to the third calculation resource cluster $3e$.

The containers app-a-1, app-a-5, and app-a-9 are assigned to the calculation resource $31w$. The remaining resource amount of the calculation resource $31w$ is 1400.

The containers app-a-2, app-a-6, and app-a-10 are assigned to the calculation resource $31x$. The remaining resource amount of the calculation resource $31x$ is 1400.

The containers app-a-3, app-a-7, and app-b-1 are assigned to the calculation resource $31y$. The remaining resource amount of the calculation resource $31y$ is 600.

The containers app-a-4, app-a-8, and app-b-2 are assigned to the calculation resource $31z$. The remaining resource amount of the calculation resource $31z$ is 600.

At this time, all containers related to the third resource definition $5e$ can be assigned to any one of the calculation resources $31w$ to $31z$ of the second calculation resource cluster $3d$.

Figure 31:
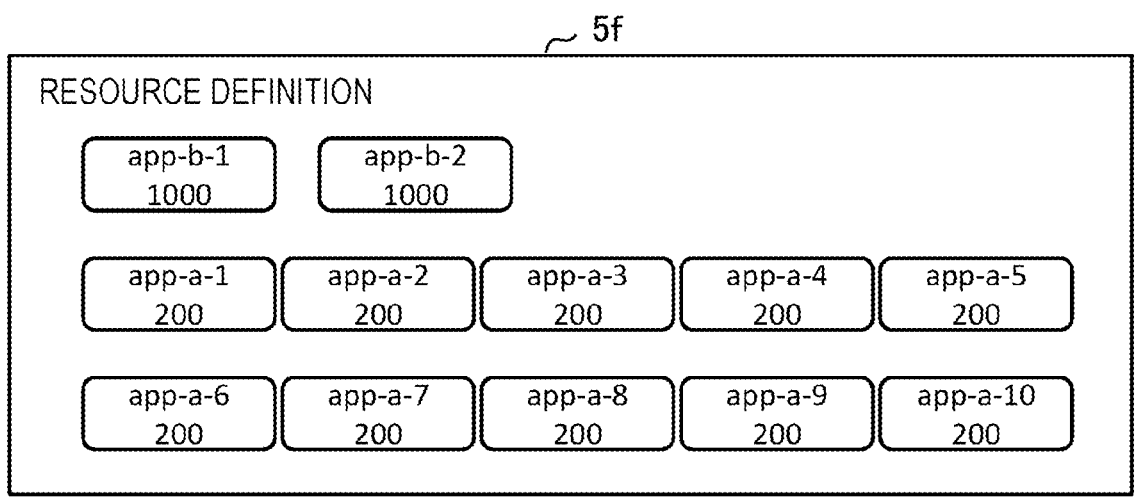
FIG. 31 is a diagram illustrating a fourth resource definition.

FIG. 31 is a diagram illustrating the fourth resource definition $5f$, and is similar to FIG. 15 described above.

Figure 32:
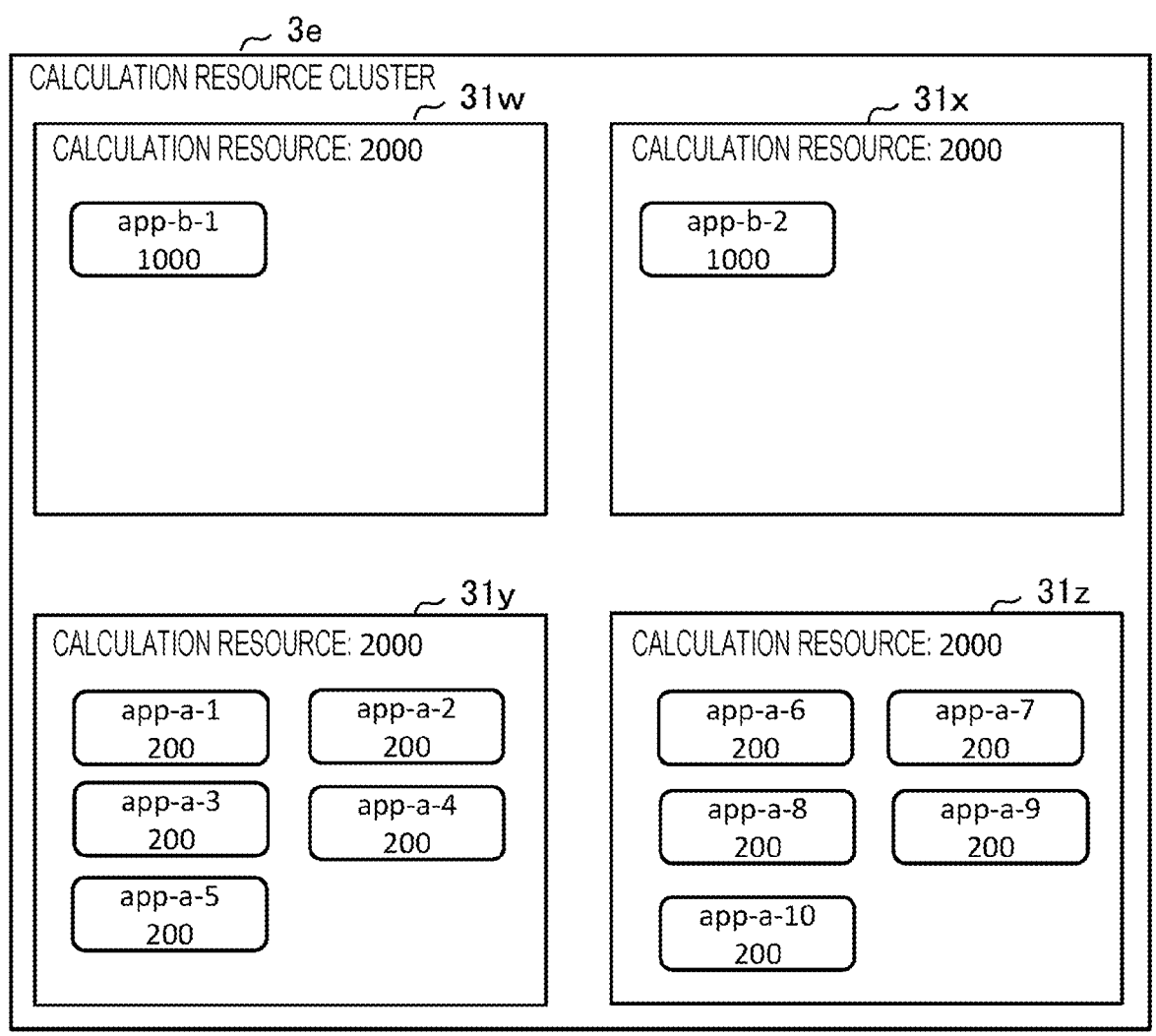
FIG. 32 is a diagram illustrating a simulation in which a fourth resource definition is assigned to a third calculation resource cluster.

FIG. 32 is a diagram illustrating a simulation in which the fourth resource definition $5f$ is assigned to the third calculation resource cluster $3e$.

The container app-b-1 is assigned to the calculation resource $31w$. The remaining resource amount of the calculation resource $31w$ is 1000.

The container app-b-2 is assigned to the calculation resource $31x$. The remaining resource amount of the calculation resource $31x$ is 1000.

The containers app-a-1 to app-a-5 are assigned to the calculation resource $31y$. The remaining resource amount of the calculation resource $31y$ is 1000.

The containers app-a-6 to app-a-10 are assigned to the calculation resource $31z$. The remaining resource amount of the calculation resource $31z$ is 1000.

At this time, all containers related to the second resource definition $5d$ can be assigned to any one of the calculation resources $31w$ to $31z$ of the third calculation resource cluster $3e$.

The calculation resource calculation unit 21 derives a configuration of the calculation resource cluster of which the simulation success rate is equal to or higher than $\gamma$. Here, the simulation success rate of the first calculation resource cluster $3c$ is 0.5. The simulation success rates of the second calculation resource cluster $3d$ and the third calculation resource cluster $3e$ are both 1.0.

Here, assuming that $\gamma$ is 0.8, the simulation success rates of the second calculation resource cluster $3d$ and the third calculation resource cluster $3e$ exceed y. In the configuration of the calculation resource cluster in which the simulation success rate exceeds y, the second calculation resource cluster $3d$ has a smallest resource amount. Therefore, the calculation resource calculation unit 21 determines the second calculation resource cluster $3d$ as a configuration.

Effects of Embodiments

The cluster management apparatuses 2 according to the first embodiment and the second embodiment appropriately determine the number of the CPUs of the calculation resources and the number of the calculation resources. Thereby, it is possible to increase an operation rate of the calculation resource and reduce an operation cost of the calculation resource.

In addition, a condition in which securing of three or more calculation resources required from a viewpoint of reliability and fault-tolerance is considered is incorporated in the constraint condition. Thereby, it is possible to secure reliability while increasing the operation rate.

Effects

Hereinafter, effects of the calculation resource cluster management apparatus and the like according to the present invention will be described.

According to the present invention described in the claim 1, there is provided a calculation resource cluster management apparatus including: a container configuration reception unit that receives a configuration definition of an application including a total requested resource amount for a calculation resource cluster and a requested resource maximum amount of a single container which operates on the calculation resource cluster; and a calculation resource calculation unit that calculates a combination of the number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

In this way, the calculation resource cluster management apparatus can efficiently accommodate and assign a container to a calculation resource.

According to the present invention described in claim 2, in the calculation resource cluster management apparatus according to claim 1, the calculation resource calculation unit calculates a combination of the number of the calculation resources and the resource amount per one calculation resource, the combination satisfying the constraint conditions, by multiplying the total requested resource amount and the requested resource maximum amount of a single container by a predetermined coefficient.

In this way, the calculation resource cluster management apparatus can calculate a combination for efficiently accommodating and assigning a container to a calculation resource by calculation.

According to the present invention described in claim 3, in the calculation resource cluster management apparatus according to claim 1, the calculation resource calculation unit calculates a combination of the number of the calculation resources and the resource amount per one calculation resource, the combination satisfying the constraint conditions, by performing a container assignment simulation using the total requested resource amount and the requested resource maximum amount of a single container.

In this way, the calculation resource cluster management apparatus can calculate a combination for efficiently accommodating and assigning a container to a calculation resource by a simulation.

According to the present invention described in claim 4, in the calculation resource cluster management apparatus according to claim 1, in a case where there are a plurality of combinations of the number of the calculation resources and the resource amount per one calculation resource that satisfy the constraint conditions, the calculation resource calculation unit further selects a combination including the smallest resource amount of the calculation resource cluster and the largest number of the calculation resources.

In this way, the calculation resource cluster management apparatus can select a most suitable combination among combinations for efficiently accommodating and assigning a container to a calculation resource.

According to the present invention described in claim 5, in the calculation resource cluster management apparatus according to claim 1, the first predetermined number and the second predetermined number are three.

In this way, the calculation resource cluster management apparatus can efficiently accommodate and assign a container to a calculation resource and calculate a combination for securing fault-tolerance.

According to the present invention described in claim 6, in the calculation resource cluster management apparatus according to claim 1, the calculation resource cluster management apparatus further includes a calculation resource operation unit that adds a necessary calculation resource or deletes an unnecessary calculation resource to or from the combination of the number of the calculation resources and the resource amount per one calculation resource, the combination being calculated by the calculation resource calculation unit.

In this way, the calculation resource cluster management apparatus can configure a calculation resource cluster capable of efficiently accommodating and assigning a container.

According to the present invention described in claim 7, there is provided a calculation resource cluster management method including: a step of receiving a configuration definition of an application including a total requested resource amount for a calculation resource cluster and a requested resource maximum amount of a single container which operates on the calculation resource cluster; and a step of calculating a combination of the number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

In this way, it is possible to efficiently accommodate and assign a container to a calculation resource.

According to the present invention described in claim 8, there is provided a calculation resource cluster management program causing a computer to execute: a procedure of receiving a configuration definition of an application including a total requested resource amount for a calculation resource cluster and a requested resource maximum amount of a single container which operates on the calculation resource cluster; and a procedure of calculating a combination of the number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

In this way, it is possible to cause the computer to execute a procedure of efficiently accommodating and assigning a container to a calculation resource.

REFERENCE SIGNS LIST

1, 1*a*, 1*b* Calculation resource cluster management system
2 Cluster management apparatus
21 Calculation resource calculation unit
22 Calculation resource operation unit
23 Calculation resource management unit
24 Container configuration reception unit
25 Container assignment destination determination unit
26 Container management unit
3, 3*a*, 3*b* Calculation resource cluster
3*c* First calculation resource cluster
3*d* Second calculation resource cluster
3*e* Third calculation resource cluster
31*a* to 31*i*, 31*p* to 31*u*, 31*w* to 31*z* Calculation resource
4*a* to 4*k*, 4*m* to 4*n*, 4*p* to 4*r* Container 5a, 5b Configuration definition file
5c First resource definition
5d Second resource definition
5e Third resource definition
5f Fourth resource definition
80 Communication network
900 Computer
910 CPU
920 RAM
930 ROM
940 HDD
950 Communication interface
960 Input/output interface
970 Media interface
980 Recording medium

The invention claimed is:

1. A calculation resource cluster management apparatus comprising one or more processors configured to:
    receive a configuration definition of an application including a total requested resource amount for a calculation resource cluster and a requested resource maximum amount of a single container which operates on the calculation resource cluster; and
    calculate a combination of a number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

2. The calculation resource cluster management apparatus according to claim 1,
    wherein the one or more processors are configured to calculate a combination of the number of the calculation resources and the resource amount per one calculation resource, the combination satisfying the constraint conditions, by multiplying the total requested resource amount and the requested resource maximum amount of a single container by a predetermined coefficient.

3. The calculation resource cluster management apparatus according to claim 1,
    wherein the one or more processors are configured to calculate a combination of the number of the calculation resources and the resource amount per one calculation resource, the combination satisfying the constraint conditions, by performing a container assignment simulation using the total requested resource amount and the requested resource maximum amount of a single container.

4. The calculation resource cluster management apparatus according to claim 1,
    wherein, in a case where there are a plurality of combinations of the number of the calculation resources and the resource amount per one calculation resource that satisfy the constraint conditions, the one or more processors are configured to select a combination including the smallest resource amount of the calculation resource cluster and the largest number of the calculation resources.

5. The calculation resource cluster management apparatus according to claim 1,
    wherein the first predetermined number and the second predetermined number are three.

6. The calculation resource cluster management apparatus according to claim 1,
    wherein the one or more processors are further configured to add a necessary calculation resource or delete an unnecessary calculation resource to or from the combination of the number of the calculation resources and the resource amount per one calculation resource.

7. A calculation resource cluster management method comprising:
    receiving a configuration definition of an application including a total requested resource amount for a calculation resource cluster and a requested resource maximum amount of a single container which operates on the calculation resource cluster; and
    calculating a combination of a number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

8. The calculation resource cluster management method according to claim 7, comprising:
    calculating a combination of the number of the calculation resources and the resource amount per one calculation resource, the combination satisfying the constraint conditions, by multiplying the total requested resource amount and the requested resource maximum amount of a single container by a predetermined coefficient.

9. The calculation resource cluster management method according to claim 7, comprising:
    calculating a combination of the number of the calculation resources and the resource amount per one calculation resource, the combination satisfying the constraint conditions, by performing a container assignment simulation using the total requested resource amount and the requested resource maximum amount of a single container.

10. The calculation resource cluster management method according to claim 7, comprising:
    in a case where there are a plurality of combinations of the number of the calculation resources and the resource amount per one calculation resource that satisfy the constraint conditions, selecting a combination including the smallest resource amount of the calculation resource cluster and the largest number of the calculation resources.

11. The calculation resource cluster management method according to claim 7,
    wherein the first predetermined number and the second predetermined number are three.

12. The calculation resource cluster management method according to claim 7, further comprising:
    adding a necessary calculation resource or deleting an unnecessary calculation resource to or from the combination of the number of the calculation resources and the resource amount per one calculation resource.

13. A non-transitory computer readable medium storing one or more instructions causing a computer to execute:

receiving a configuration definition of an application including a total requested resource amount for a calculation resource cluster and a requested resource maximum amount of a single container which operates on the calculation resource cluster; and calculating a combination of a number of calculation resources and a resource amount per one calculation resource, the combination satisfying constraint conditions that a resource amount of the calculation resource cluster is larger than the total requested resource amount, that the number of calculation resources of the calculation resource cluster is equal to or larger than a first predetermined number, and that the number of calculation resources to which a requested resource maximum amount of a single container included in the calculation resource cluster can be assigned is equal to or larger than a second predetermined number.

14. The non-transitory computer readable medium according to claim 13, wherein the one or more instructions cause the computer to execute:

calculating a combination of the number of the calculation resources and the resource amount per one calculation resource, the combination satisfying the constraint conditions, by multiplying the total requested resource amount and the requested resource maximum amount of a single container by a predetermined coefficient.

15. The non-transitory computer readable medium according to claim 13, wherein the one or more instructions cause the computer to execute:

calculating a combination of the number of the calculation resources and the resource amount per one calculation resource, the combination satisfying the constraint conditions, by performing a container assignment simulation using the total requested resource amount and the requested resource maximum amount of a single container.

16. The non-transitory computer readable medium according to claim 13, wherein the one or more instructions cause the computer to execute:

in a case where there are a plurality of combinations of the number of the calculation resources and the resource amount per one calculation resource that satisfy the constraint conditions, selecting a combination including the smallest resource amount of the calculation resource cluster and the largest number of the calculation resources.

17. The non-transitory computer readable medium according to claim 13, wherein the first predetermined number and the second predetermined number are three.

18. The non-transitory computer readable medium according to claim 13, wherein the one or more instructions further cause the computer to execute:

adding a necessary calculation resource or deleting an unnecessary calculation resource to or from the combination of the number of the calculation resources and the resource amount per one calculation resource.

* * * * *